United States Patent [19]

Williams et al.

[11] Patent Number: 5,033,044
[45] Date of Patent: Jul. 16, 1991

[54] SYSTEM FOR ALIGNING TRANSMISSION FACILITY FRAMING BITS TO THE SONET H4 MULTIFRAME INDICATOR BYTE

[75] Inventors: Timothy J. Williams; Ertugrul Baydar, both of Raleigh, N.C.

[73] Assignee: Alcatel NA Network Systems Corp., Raleigh, N.C.

[21] Appl. No.: 523,596

[22] Filed: May 15, 1990

[51] Int. Cl.5 ............................................... H04J 3/06
[52] U.S. Cl. ............................. 370/105.1; 370/100.1; 370/55
[58] Field of Search ...................... 370/100.1, 102, 55, 370/105.1, 105.2, 105.4, 106; 375/111

[56] References Cited

U.S. PATENT DOCUMENTS 4,468,767 8/1984 Warren et al. .......................... 370/55
4,928,275 5/1990 Moore et al. ......................... 370/102
4,935,920 6/1990 Taniguchi et al. ................ 370/85.15
4,949,334 8/1990 Bernhardt ............................. 370/55

Primary Examiner—Douglas W. Olms
Assistant Examiner—H. Kizou
Attorney, Agent, or Firm—Peter C. Van Der Sluys

[57] ABSTRACT

A system for aligning framing bits from independent digital transmission facilities with framing of a higher transmission rate facility includes a RAM memory. Received framing bits from the independent digital transmission facilities are stored at RAM locations in accordance with multiframe addresses of the framing bits relative to the multiframe format of the independent facility. Multiframe indicator bytes indicative of the framing of the higher transmission rate facility are used as addresses to read framing bits from RAM. The multiframe address of the independent digital transmission facilities is established by a counter for each independent facility, said counter being synchronized to the framing of the independent facility and incremented to provide addresses identical to the multiframe indicator bytes of the higher transmission rate facility.

13 Claims, 20 Drawing Sheets

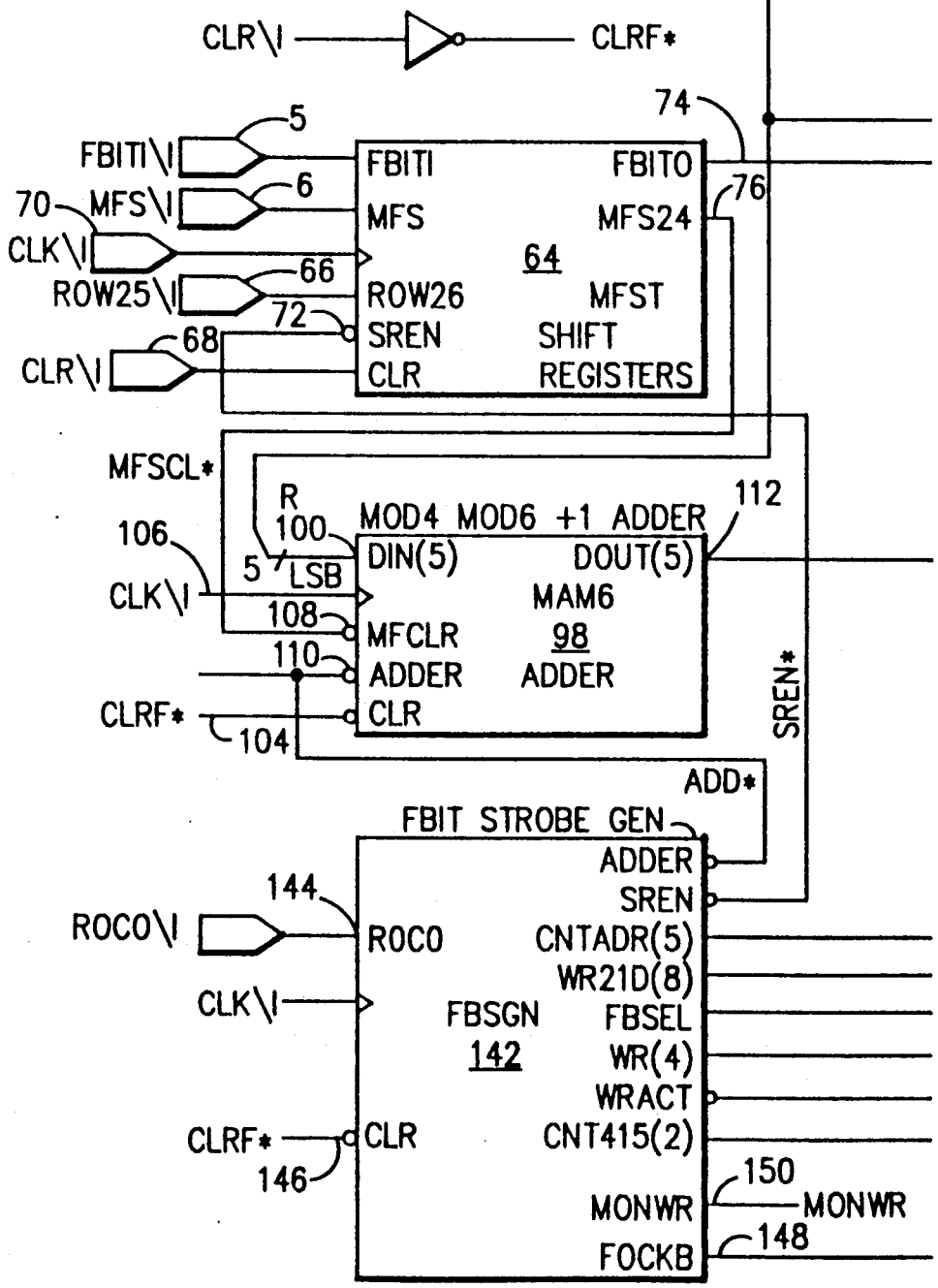

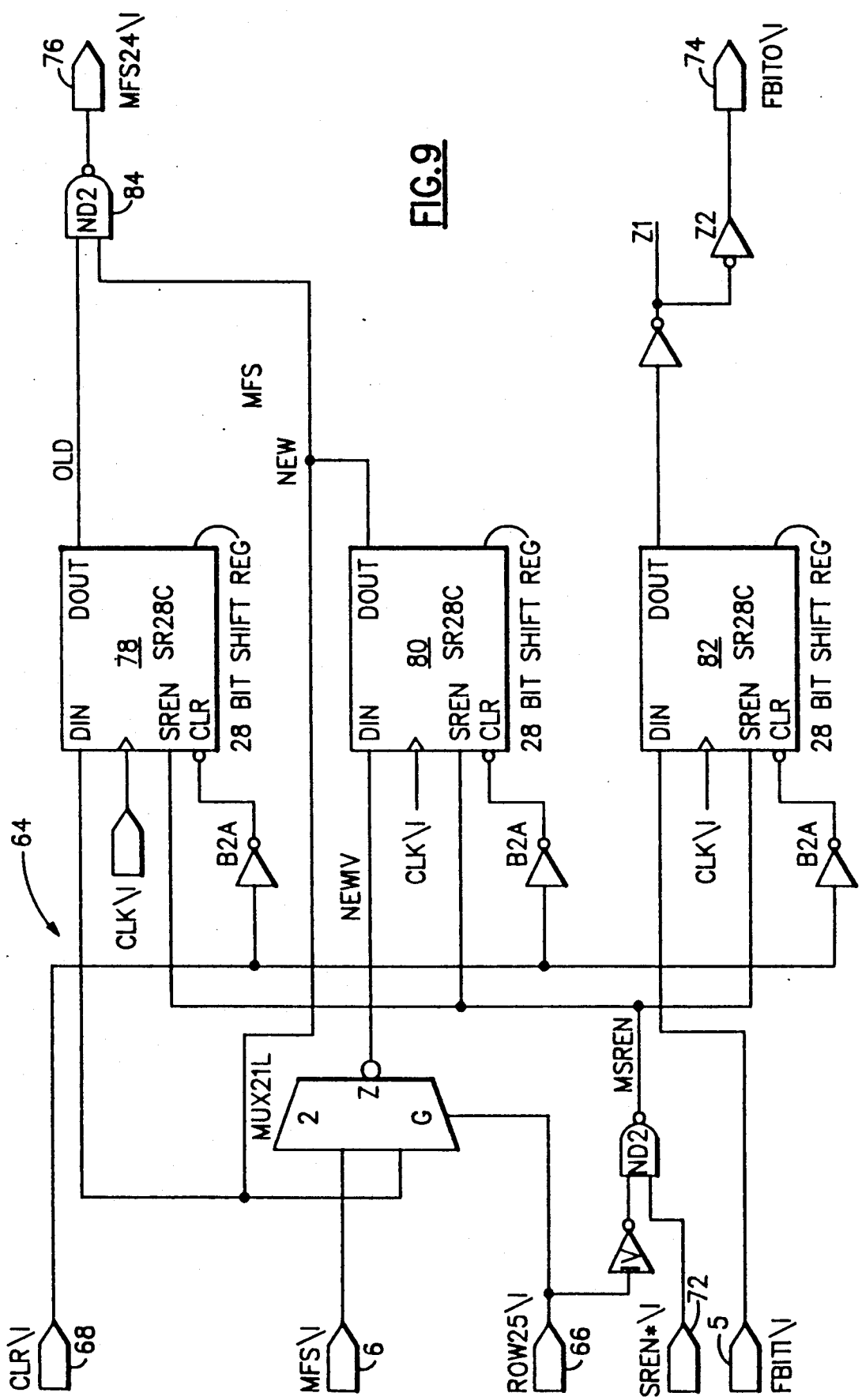

SYSTEM FOR ALIGNING TRANSMISSION FACILITY FRAMING BITS TO THE SONET H4 MULTIFRAME INDICATOR BYTE

BACKGROUND OF THE INVENTION

1. Field of the Invention

The present invention relates to digital telephone transmission, and more particularly, to a system for aligning framing bits from independent digital transmission facilities with framing of a higher transmission rate facility such as SONET.

2. Description of the Prior Art

The American National Standard Institute, Inc. (ANSI) T1.105-1988 describes the Synchronous Optical Network (SONET) protocol for telecommunications equipment. This standard is incorporated herein by reference. The SONET protocol is particularly adapted for optical transmission, and various transmission levels have been standardized at specified line rates in M bit/s. The first level, Optical Carrier Level 1, or OC-1, transmits data at the rate of 51.84 M bits/s. This carrier level has a corresponding electrical level called Synchronous Transport Signal Level 1, or STS-1.

In order to access this high-frequency carrier level, access products are required so that lower bandwidth carriers can the introduced into or extracted from the STS-1 transmission level. These access products provide a SONET network with nodes where components of an STS-1 signal can be added to or dropped out of the main signal. The components that are added to the main signal must be inserted so as to maintain the integrity of the SONET signal. A typical sub-component of an STS-1 SONET signal is a DS1 signal having a bit rate of 1.544 M bit/s. Twenty-eight DS1 signals can be supported by an STS-1 carrier. Within the DS1 signal format twenty-four DS0 64 K bits/s signals can be supported plus one 8K bits/s framing signal.

The SONET transmission is serial, comprising a total of 810 serial bytes. The frame structure for an STS-1 is shown in FIG. 1. The frame comprises 90 columns×9 rows of bytes, with 8 bits per byte. The sequence of transmission of the bytes is row by row, from left to right. The frame is divided into three parts: the section and line overhead, which are contained in the first three columns; and the payload, which is found in the 87 remaining columns. The 87 payload columns and the nine rows form a Synchronous Payload Envelope (SPE) which includes 783 bytes. Nine of the SPE bytes are allocated to path overhead.

The SPE can begin anywhere within the 87×9 byte envelope. Typically, the SPE begins in one SONET frame and ends in another. A payload pointer provided in overhead bytes H1 and H2 points to the byte where the SPE begins, shown, for example, as P=0 in FIG. 1. The information within the SPE is transported in Sub-STS-1 payloads called Virtual Tributaries, or VTs. There are several levels of VTs; however, it is only necessary to deal with VT 1.5 for purposes of describing this invention. When the STS-1 payload supports 28 DS1 services, one VT at the 1.5 level is provided for each DS1 service.

The 783 bytes of one SPE belong to 28 tributaries, wherein each tributary can carry a DS1 payload. The SONET bytes are mapped into a DS1 payload as illustrated in FIG. 2. The DS1 payload has 27 bytes, 24 of which carry DS0 channels. The first byte carries a VT pointer, or address; a second byte is unused; and the third byte carries signaling data and the framing bit for the DS1 payload. The framing bit of each DS1 has a repetitive pattern that is used by equipment to locate the DS0 channel data, and indicates the DS1 signaling frame. The specific framing pattern for each DS1 can vary and include such features as embedded data channels, but the pattern commonly represents a 12 or 24 channel multiframe.

FIG. 3 illustrates the transmission order of the SONET payload contained within the SPE's of 24 SONET frames. For the sake of clarity, a number of bytes or rows of the SPE are not shown in FIG. 3. These bytes include: the bytes in the first two rows of each SPE, which would contain bytes 1 and 2 of each of the 28 tributaries as shown in FIG. 2, the nine path overhead bytes, and additional 'fixed stuff' bytes. In addition, the SPE has been shown as being located entirely within one SONET frame while in most cases the SPE will occupy parts of two SONET frames. Removing these two rows facilitates the illustration in FIG. 3 of the signaling bits provided in each SONET frame. The framing bit is not shown in FIG. 3, but it follows the signaling bits in each byte as shown in FIG. 2. Thus, the first row of each frame shown in FIG. 3 is the signaling and framing row and contains byte number 3 for each of the tributaries. The transmission order proceeds from left to right in each descending row of a frame. Thus, bytes containing four signaling bits and one framing bit for tributaries 0–27 are transmitted in sequence, after which the data for channel 0 of each tributary is transmitted, followed by the data for the other channels through to the transmission of the data for channel 23.

Due to the presence of nine overhead bytes (not shown), bytes 1 and 2 of each tributary, and additional unused 'fixed stuff' bytes in the SPE, the signaling bytes start with SPE byte 60 and continue through byte 87.

The SONET format specifies the multiframe pattern shown in FIG. 3 with a path overhead byte, called the H4 multiframe indicator byte carried in the SPE. The H4 multiframe indicator byte applies to every VT in the SPE. In an operative system the framing bit sequence in each VT must be aligned with the H4 multiframe indicator byte of the SPE. The SONET H4 byte is formatted as follows:

| Bits - | 7 | 6 | 5 | 4 | 3 | 2 | 1 | 0 |
|---|---|---|---|---|---|---|---|---|
| Data - | P1 | P0 | SI2 | SI1 | C3 | C2 | C1 | T |

The C3, C2, and C1 bits are unused bits, since they relate to a 2.048M b/s standard which is not used in North America. Thus, the part of the H4 byte of interest consists of five bits and can have values of 0 to 23 to identify any one of 24 consecutive SONET frames transmitted in SPE's. Table 1 illustrates the H4 bytes for frames (FR) 0–23 and the associated SONET formatted signalling for ESF and SF signalling which may be provided in each frame.

Access products that introduce DS1 signalling into the SONET network are required to align with the SONET H4 multiframe indicator byte, when the SONET format is in byte synchronous mode. Potentially, each DS1 signal (up to 28) can have a different alignment from the H4 multiframe indicator byte and from the other twenty-seven DS1 signals being added to the SONET network. There are no known solutions to the problem of aligning DS1 signals with the SONET H4 multiframe indicator byte.

In the access products for which this invention was conceived, a 16-bit internal byte is used for each channel, with each bit being provided on a separate line of a parallel bus. Thus, for each clock pulse a complete 16 bit byte of information is obtained. The internal format for a 16-bit byte is as follows:

| Bit No: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | D7 | D6 | D5 | D4 | D3 | D2 | D1 | D0 | A | B | C | D | MFS | MFS2 | | P |

The internal 16-bit bus operates at a higher bandwidth and has a total of 32 channels available. One channel is assigned specifically to each of the 24 channels of the DS1 signals. The remaining channels are used for various control functions, specifically, one of the channels is used for the signaling and framing information. The internal 16-bit bus is described in detail in U.S. patent application Ser. No. 351,458 filed May 12, 1989 and entitled "Serial Transport Frame Format Method", said application being commonly assigned herewith and incorporated herein by reference.

The SONET byte which carries the framing bit (F) is formatted as follows:

| Bit No. | D7 | D6 | D5 | D4 | D3 | D2 | D1 | D0 |
|---|---|---|---|---|---|---|---|---|
| SONET | R | R | S1 | S2 | S3 | S4 | F | R |

In the above, the R bits are not used, the S1–S4 bits are signaling bits as shown in the bytes of FIG. 3, and the F bit is the framing bit.

In the system for which this invention was conceived, the SONET format given above is also used for the bits D7-D0 of the internal 16-bit signaling and framming byte. Of the additional bits in the internal format, MFS and MFS2 bits indicate the multiframe address of the F bits in the VT level 1.5 or DS1 handled by the tributary. Table 1 also shows the relationship between the MFS bit and the SONET H4 bytes in an aligned system.

The access products used to extract and add sub-components to the STS-1 transmission level include both an add-drop multiplexer and a terminal multiplexer. The terminal multiplexer receives and extracts all data from the STS-1 and inserts new data in a return path. The add-drop multiplexer, however, poses special problems, since it facilitates the extraction and/or addition of any number of channels carried on the STS-1 line. Thus, some channels pass directly through an add-drop multiplexer, while some channels are extracted and other channels are added.

All received VTs are converted to the internal format. Thus, the through VTs could be treated similarly to the added VTs by realigning them to the H4 multiframe indicator similarly to the added VTs. However, this would cause unnecessary delay for the through VTs, due to processing by the multiplexer. Preferably this delay should be avoided by passing each through tributary directly through the multiplexer and only aligning the tributaries being added.

SUMMARY OF THE INVENTION

The present invention contemplates a frame bit alignment system that inserts a variable synchronous delay in the F bit multiframe address of each added tributary. Said delay for each tributary being equal to the difference between the H4 multiframe indicator address and the multiframe address of the added tributary. The multiframe address of the added tributary is derived from the transitions of the internal system MFS and MFS2 bits.

In a terminal multiplexer application, each VT framing bit is delayed by the number of frames necessary to cause the multiframe address associated with the VT framing bit to align with the H4 multiframe indicator address of the SONET H4 byte. This results in a delay

TABLE 1

| | | | | | | | Signaling Frame Sequence | | | | |
|---|---|---|---|---|---|---|---|---|---|---|---|
| | | H4 Bytes | | | | | | ESF | | | |
| MFS | FR | P1 | P0 | SI2 | SI1 | T | S1 | S2 | S3 | S4 | SF |
| 1 | 0 | 0 | 0 | 0 | 0 | 0 | A0 | A1 | A2 | A3 | A bits |
| 1 | 1 | 0 | 0 | 0 | 0 | 1 | A4 | A5 | A6 | A7 | (same as ESF) |
| 1 | 2 | 0 | 0 | 0 | 1 | 0 | A8 | A9 | A10 | A11 | |
| 1 | 3 | 0 | 0 | 0 | 1 | 1 | A12 | A13 | A14 | A15 | |
| 1 | 4 | 0 | 0 | 1 | 0 | 0 | A16 | A17 | A18 | A19 | |
| 1 | 5 | 0 | 0 | 1 | 0 | 1 | A20 | A21 | A22 | A23 | |
| 1 | 6 | 0 | 1 | 0 | 0 | 0 | B0 | B1 | B2 | B3 | B bits |
| 1 | 7 | 0 | 1 | 0 | 0 | 1 | B4 | B5 | B6 | B7 | (same as ESF) |
| 1 | 8 | 0 | 1 | 0 | 1 | 0 | B8 | B9 | B10 | B11 | |
| 1 | 9 | 0 | 1 | 0 | 1 | 1 | B12 | B13 | B14 | B15 | |
| 1 | 10 | 0 | 1 | 1 | 0 | 0 | B16 | B17 | B18 | B19 | |
| 1 | 11 | 0 | 1 | 1 | 0 | 1 | B20 | B21 | B22 | B23 | |
| 0 | 12 | 1 | 0 | 0 | 0 | 0 | C0 | C1 | C2 | C3 | A bits |
| 0 | 13 | 1 | 0 | 0 | 0 | 1 | C4 | C5 | C6 | C7 | |
| 0 | 14 | 1 | 0 | 0 | 1 | 0 | C8 | C9 | C10 | C11 | |
| 0 | 15 | 1 | 0 | 0 | 1 | 1 | C12 | C13 | C14 | C15 | |
| 0 | 16 | 1 | 0 | 1 | 0 | 0 | C16 | C17 | C18 | C19 | |
| 0 | 17 | 1 | 0 | 1 | 0 | 1 | C20 | C21 | C22 | C23 | |
| 0 | 18 | 1 | 1 | 0 | 0 | 0 | D0 | D1 | D2 | D3 | B bits |
| 0 | 19 | 1 | 1 | 0 | 0 | 1 | D4 | D5 | D6 | D7 | |
| 0 | 20 | 1 | 1 | 0 | 1 | 0 | D8 | D9 | D10 | D11 | |
| 0 | 21 | 1 | 1 | 0 | 1 | 1 | D12 | D13 | D14 | D15 | |
| 0 | 22 | 1 | 1 | 1 | 0 | 0 | D16 | D17 | D18 | D19 | |
| 0 | 23 | 1 | 1 | 1 | 0 | 1 | D20 | D21 | D22 | D23 | | of from one to twenty-four frames, depending on the difference.

In an add-drop multiplexer application, only those tributaries that are added are aligned, since realignment of a through tributary would result in a permanent twenty-four frame delay that is undesirable.

A memory provisioned by a network control processor stores one bit for each of the twenty-eight tributaries to provide an indication as to whether the tributary is an added or a through tributary. This memory is addressed so as to provide a control signal for an F bit multiplexer, which selects the F bit for through tributaries or an aligned F bit for added tributaries.

In each 125 usec. frame period, twenty-eight F bits one from each tributary are loaded into twenty-eight, independent, twenty-four bit deep, one bit wide, elastic stores. During the SONET signaling/framing row, an output of these elastic stores is made available, one by one, to the F bit multiplexer.

Each tributary F bit has associated MFS and MFS2 bits which indicate the respective tributary multiframe address. Each tributary has a modulo 24 counter, synchronized by the MFS bit transition from 0 to 1 between frames 23 and 0 for the tributary as shown in Table 1. The counter value is used to indicate the F bit multiframe address. This counter is used to control the depth of each tributary elastic store.

The need for these counters, and the elastic stores, created significant design problems due to the large amount of storage required. Space was required for 672 F-bits and 28 five-bit counters. A significant savings of surface area in the semiconductor devices used to implement this invention was realized by using a standard configuration RAM uniquely configured to store both counter count values and the F bits, and by developing a multiplexing architecture to support the counting and storage functions.

A primary objective of the present invention is to provide framing bit alignment for added tributaries to a SONET STS-1 transmission interface.

Another objective of the present invention is to provide a system which can provide framing bit alignment that is compatible with both terminal multiplexers and add-drop multiplexers.

Another objective of the present invention is to provide for minimum delay for through tributaries while maintaining the capability to support added tributaries.

Another objective of the present invention is to provide a framing bit aligner that is provisionable by a processor to pass data for selected tributaries through the multiplexer while multiplexing in data for other tributaries.

Another objective of the present invention is to provide an efficient architecture for 28 24-bit deep, one bit wide, independent elastic stores.

Another objective of the present invention is to provide a device that can implement 28 elastic stores in a single on-chip RAM available in a standard gate array.

Another objective of the present invention is to implement 28 counters in RAM, thereby saving the need for numerous gates.

DESCRIPTION OF THE DRAWINGS

FIGS. 3, 3A and 3B schematically illustrate the transmission order of signaling in 24 SONET frames.

FIGS. 7, 7A and 7B are schematic diagram of block 12 of FIG. 5.
FIGS. 8, 8A, 8B and 8C are schematic diagram of block 2 of FIG. 4.
FIG. 9 is a schematic diagram of block 64 of FIG. 8A.

DETAILED DESCRIPTION OF THE PREFERRED EMBODIMENT

Figures 1, 2:
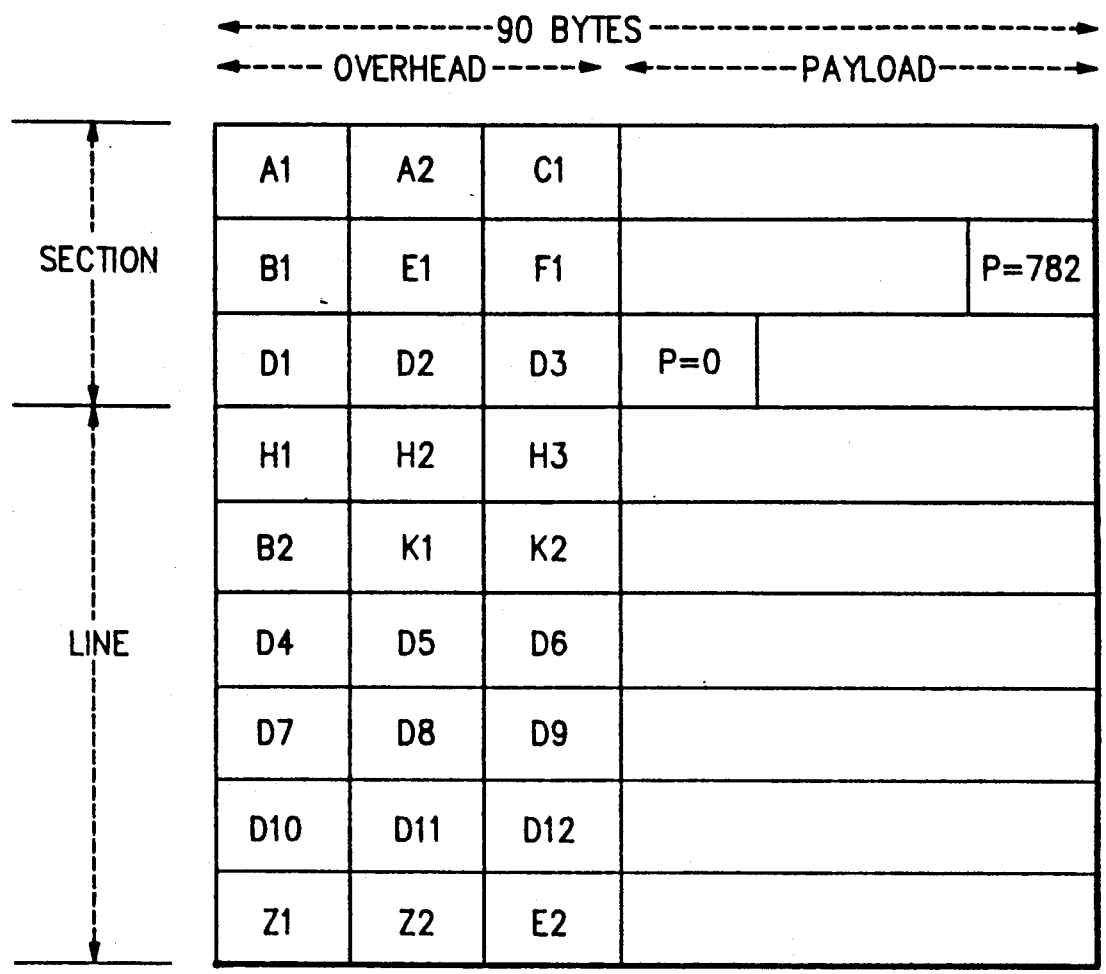
FIG. 1 schematically illustrates a SONET frame.
FIG. 2 schematically illustrates DS1 payload bytes.

The system of the invention aligns tributary F bits to the SONET H4 multiframe indicator address by delaying the F bits from 1 to 24 frames. A delay of 24 frames would result in no alignment change, only an absolute 3 millisecond transport delay. The number of frames each F bit is delayed is controlled by the difference between the SONET H4 multiframe indicator address, indicated by the H4 byte, and the tributary multiframe address, indicated by the MFS and MFS2 bits of the internal system byte.

The operation of the system can be inhibited for any tributary through a provisionable register. This allows for bit synchronous operation, or minimization of delay in the case of ADM through tributaries. In a bit synchronous tributary, the bit located in the F position carries no framing information and the F-bits should be transported as received. In a tributary sourced by an ADM through path, the tributary remains aligned as received, since the system would introduce an undesirable absolute 24 frame delay if realignment were attempted.

In this system, a RAM is used to store F-bits and to store counter values for each tributary F-bit, which values are needed to generate write addresses for an incoming tributary F-bit. A standard 36 bits wide by 32 bits deep RAM, with 9 bit byte write control (four write lines) is used. The configuration of the RAM is shown in Table 2. Of this standard RAM, only 32 bits of the RAM word are used as shown in Table 3.

TABLE 2

| | 012345678 | | | ---- 35 |
|---|---|---|---|---|
| 0 | 012345678X | 012345678X | 012345678X | 012345678X |
| 1 | 012345678X | 012345678X | 012345678X | 012345678X |
| : : | : | : | : | : |
| : : | : | : | : | : |
| : : | : | : | : | : |
| : : | : | : | : | : |
| 30 | 012345678X | 012345678X | 012345678X | 012345678X |
| 31 | 012345678X | 012345678X | 012345678X | 012345678X |

Note: X = Not used locations

TABLE 3

| | 01234567 | | | ... 31 |
|---|---|---|---|---|
| 0 | 01234567 | 01234567 | 01234567 | 01234567 |
| 1 | 01234567 | 01234567 | 01234567 | 01234567 |
| : : | : | : | : | : |
| : : | : | : | : | : |
| : : | : | : | : | : |
| 30 | 01234567 | 01234567 | 01234567 | 01234567 |
| 31 | 01234567 | 01234567 | 01234567 | 01234567 |

Note: X = Not used locations

The counters are implemented by storing the value of a count as data in the RAM, by adding an increment value after every read, and writing the updated value back to the counter location. The F-bits are stored in such a way that the H4 byte can be used as an address to address an entire row of 28 aligned F bits one for each tributary. The counter values stored in RAM are the values of the write addresses for the next F bit on an individual tributary basis. Thus, the RAM is used to store both the counter values and the F-bits. A small part of this RAM (5×28) is used to store the 28 five-bit counters, while the remainder (24×28) is used for the F bits.

Table 4 illustrates the actual utilization of the RAM. Rows 0–5, 8–13, 16–21 and 24–29 each store 28 F-bits. Rows 6, 7, 14, 15, 22, 23, 30 and 31 each store, a number of five bit counter values. The number shown after the five bit counter value merely identifies the tributary with which the counter value is associated and is not part of the value.

The RAM utilization shown in Table 4 is unique in that it allows one to use the H4 bytes shown in Table 1 as addresses to the rows to the RAM. It should be noted that the H4 byte counts from 0 to 5 and then skips to 8. In like manner, H4 also skips 14, 15, 22, 23, 30 and 31. Thus, in Table 4, F-bits are not stored in rows 6, 7, 14, 15, 22, 23, 30 and 31. These rows are used for storing counter values.

TABLE 4

| FRAME NUMBER | 32 × 32 RAM Utilization Tributary Number | | | |
|---|---|---|---|---|
| | 01234567 | | | ... 31 |
| 0 | 01234567 | ........ | ........ | ..27XXXX |
| 6 | 01234- 0 | 01234- 8 | 01234-16 | 01234-24 |
| 7 | 01234- 1 | 01234- 9 | 01234-17 | 01234-25 |
| 8 | 01234567 | ........ | ........ | ..27XXXX |
| : : | : | : | : | : |
| : : | : | : | : | : |
| 14 | 01234- 2 | 01234-10 | 01234-18 | 01234-26 |
| 15 | 01234- 3 | 01234-11 | 01234-19 | 01234-27 |
| 16 | 01234567 | ........ | ........ | ..27XXXX |
| : : | : | : | : | : |
| 22 | 01234- 4 | 01234-12 | 01234-20 | XXXXXXXX |
| 23 | 01234- 5 | 01234-13 | 01234-21 | XXXXXXXX |
| 24 | 01234567 | ........ | ........ | ..27XXXX |
| : : | : | : | : | : |
| 30 | 01234- 6 | 01234-14 | 01234-22 | XXXXXXXX |
| 31 | 01234- 7 | 01234-15 | 01234-23 | XXXXXXXX |

The present invention contemplates a system wherein F bits and associated MFS bits coming from the internal 16 bit byte format for each DS1 or tributary are stored first in shift registers, while the aligned F bits are read from the RAM using the H4 multiframe indicator as an address. After the SONET row containing the F bits has been read from the RAM and transmitted, the new F bits from the shift registers are written into the RAM using the stored count values as addresses. The MFS bits for each tributary are decoded to determine the zero to one transition shown in Table 1 and to reset the counter value for the tributary to zero when the decode is true.

In this system, four different steps are performed to update the F bits. First, the stored counter value for a tributary being updated is read from RAM and is used as an address which can be any one of 24 addresses, corresponding to H4 byte values, depending upon the time when it is read. Next, the F bits stored at that address in RAM for all 28 tributaries are read. Next, the new F bit from the shift register is multiplexed into the correct tributary column with the other 27 stored F bits of the addressed row in RAM and all 28 F bits are written back into the stored address in RAM. Finally, the counter value that was read is incremented and written back into the tributary address location. These steps are repeated twenty-eight times, until all tributaries are updated. No contention between the F bit update and the next SONET H4 read arises since the update procedure and the read are interleaved.

Figure 4:
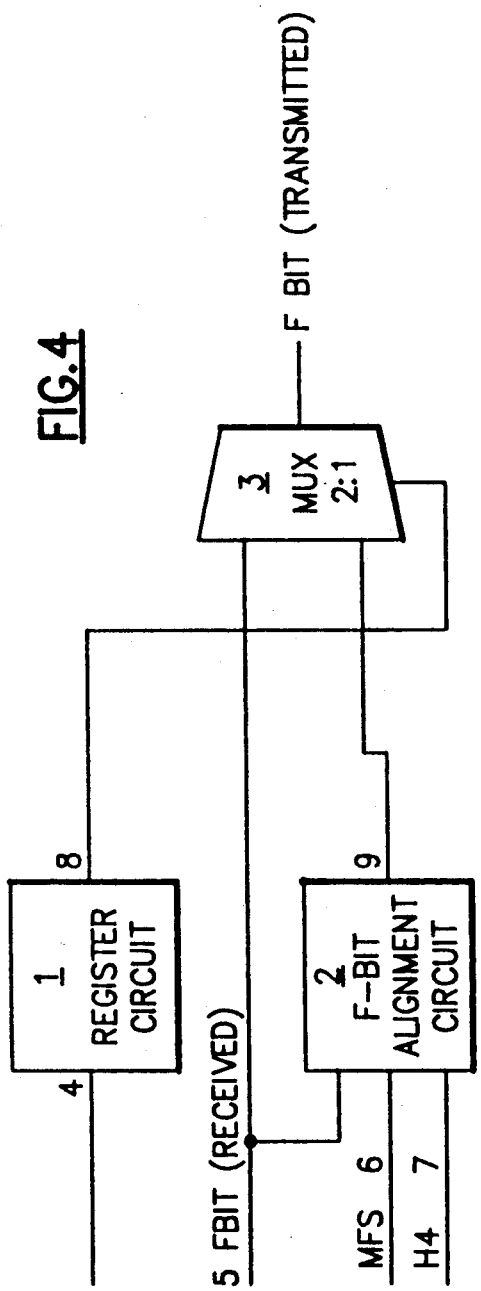
FIG. 4 is a block diagram of the system of the present invention.

FIG. 4 shows a basic block diagram of the F bit alignment system of the present invention. A register circuit 1 has one latch for each tributary to control whether the F bit for the tributary is to be passed through or is to be taken from an F bit alignment circuit 2. These registers are provisioned from a network control processor via a bus 4. An output 8 of the register circuit provides a one bit mode indicator signal which is valid for a tributary when its SONET address is active in the register circuit.

An F bit alignment circuit 2 operates independently of the output of the register circuit 1. Circuit 2 stores F bits received at an input 5, at addresses dependent upon MFS bits received at an input 6. Circuit 2 provides at an output 9 F bits aligned with an H4 multiframe indicator byte received at an input 7. A multiplexer 3 selects the received F bit from input 5 or an aligned F bit from alignment circuit 2 in accordance with the mode indicator bit received from output 8 of register circuit 1. Thus, the network control processor can identify added tributaries for which the F bits must be realigned and through tributaries where realignment is not necessary.

Figure 5:
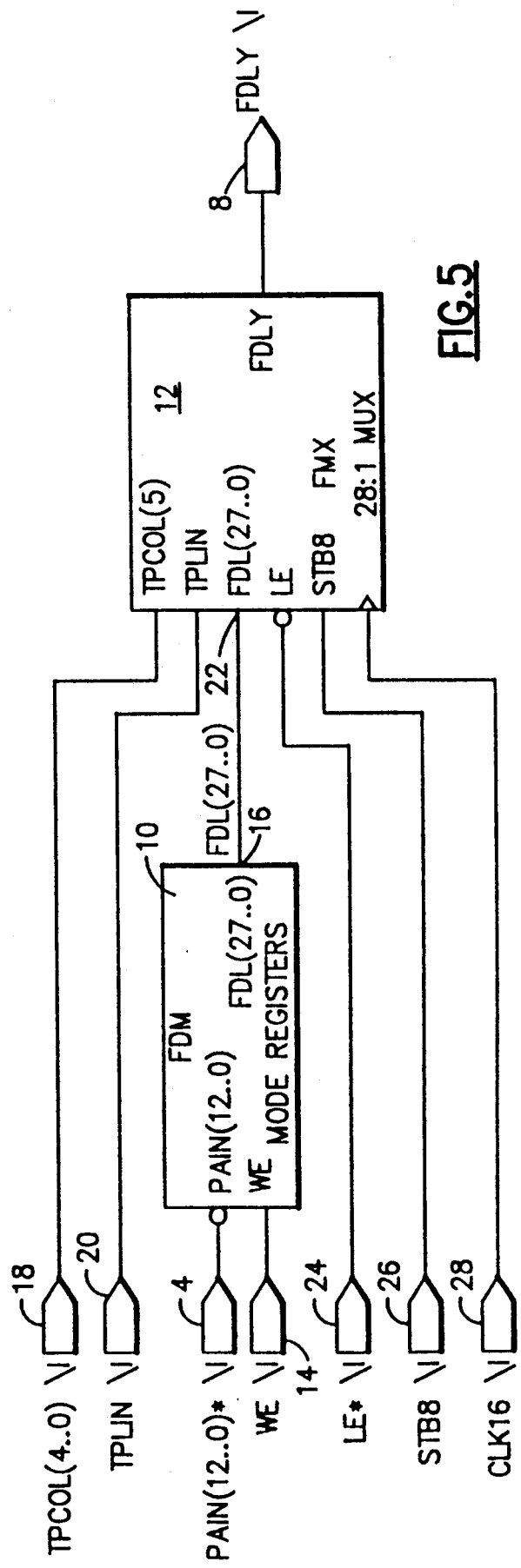
FIG. 5 is a schematic diagram of block 1 of FIG. 4.

FIG. 5 illustrates the details of register circuit 1 of FIG. 4. A mode register 10, shown in greater detail in FIG. 6, has 28 latches with outputs to a 28 to 1 multiplexer 12, shown in FIG. 7, which outputs one bit at output 8 which is valid for every addressed tributary. The mode register 10 is connected to a 13 bit bus 4 from provisioning circuitry of a network control processor. A write strobe, WE, is received at an input 14. Mode register 10 outputs 28 bits of parallel data at output 16 said data being related to the mode of each tributary. The state of each data bit determines whether the related F bit will be selected from the F bit alignment circuit 2 or from the F bit input 5.

The multiplexer 12 receives at an input 18 five bit payload column addresses which identify tributaries. A payload indicator is received from an input 20 while an input 22 is connected to the output 16 of mode register 10 to receive the 28 bits of data. An LE* signal which occurs concurrent with the write strobe, WE, is active for two SONET overhead bytes is received from input 24. LE* is used to turn the output of the multiplexer off during mode register loading. An 8 MHz clock (STB8) is provided to an input terminal 26 and a 16 MHz clock is connected to an input terminal 28. The payload column addresses and the payload indicator are derived from the SONET payload pointer bytes H1 and H2.

Figure 6:
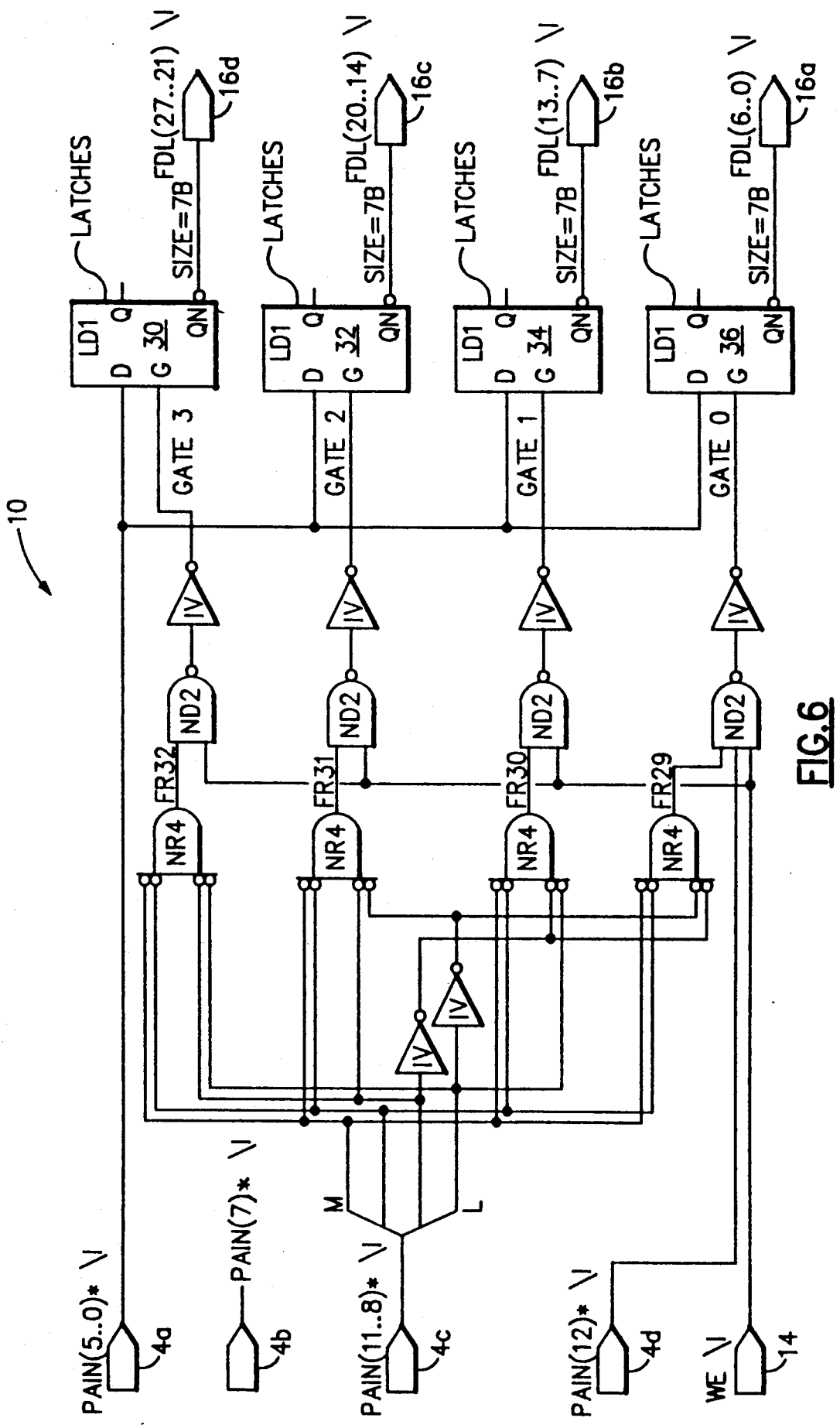
FIG. 6 is a schematic diagram of block 10 of FIG. 5.

FIG. 6 shows the details of mode register 10 which comprises 28 latches 30-36 organized as four groups of seven latches each. PAIN 6-0* at an input 4a is an inverted data bus, and PAIN 11-8* at an input 4c is an inverted address bus from the network control processor. The addresses are valid for two SONET overhead bytes, which is equivalent to four clock cycles. Write enable, WE, which is at input 14, is generated during the third quarter of this four-cycle period. PAIN 12* at in input 4d is an inverted signal which enables the wrote strobe, WE. The outputs of the latches are connected in parallel to the output 16 and are shown as four groups 16a-16d of seven outputs each.

Figure 7A:
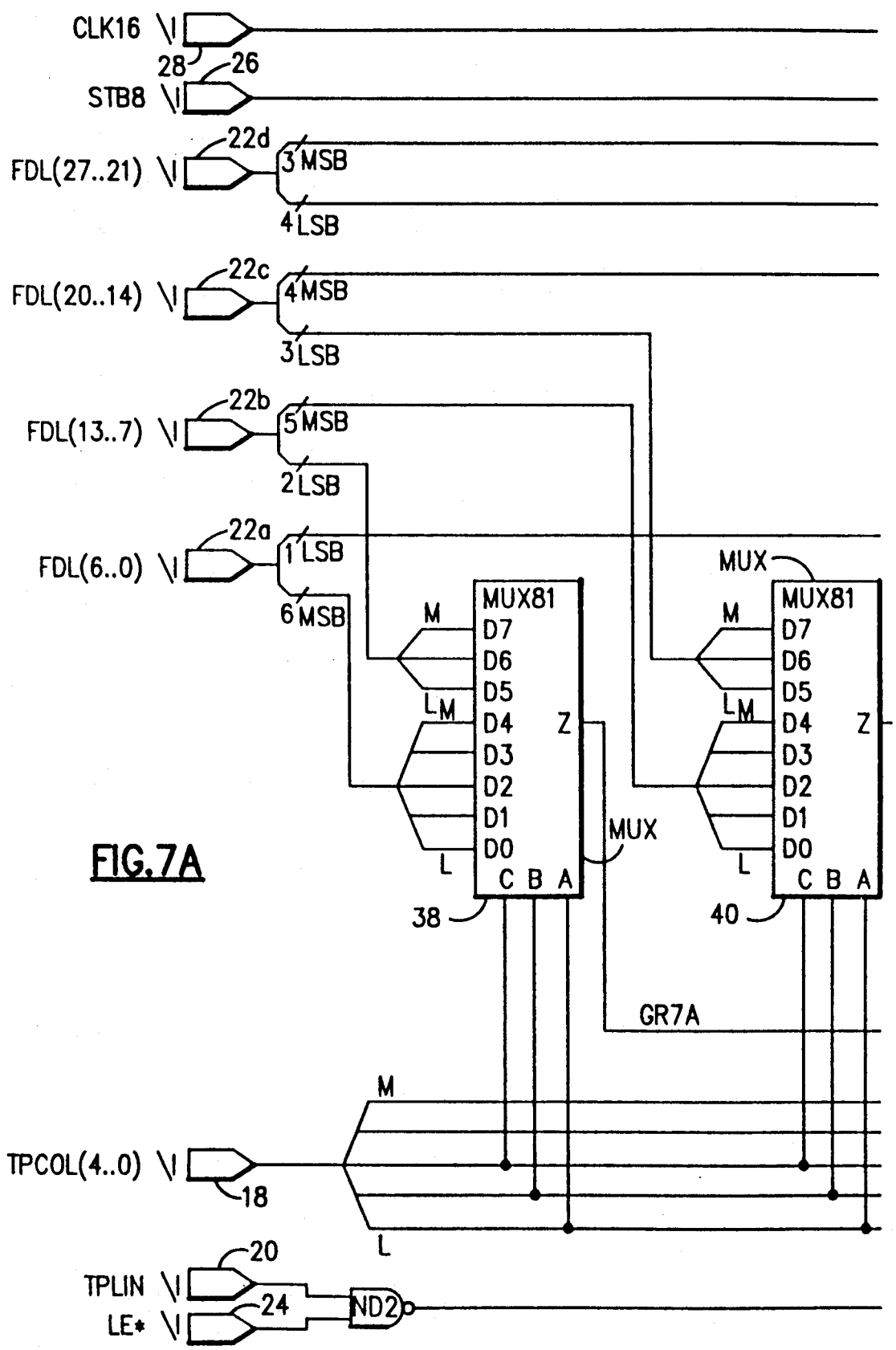
Figure 7B:
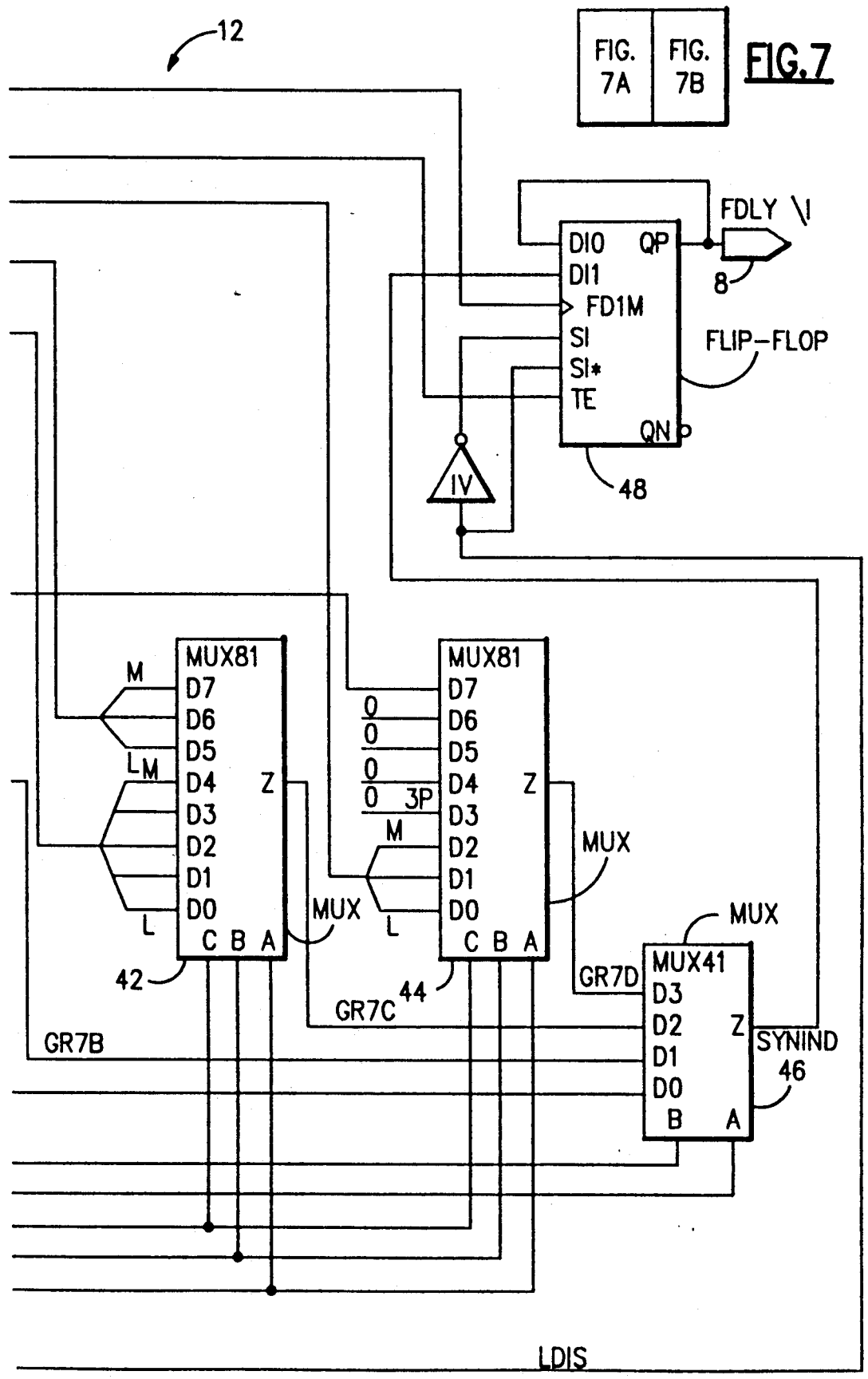

FIG. 7 shows the internal circuitry of multiplexer 12 which has input 22 (22a-22d) internally connected to inputs of four 8 to 1 multiplexers 38-44. Outputs of these multiplexers are further multiplexed using a 4 to 1 multiplexer 46 to obtain a one-bit output. The multiplexers are controlled with the SPE tributary addresses TPCOL 4-0 provided at input 18. A flip-flop 48, which is enabled by TPLIN and LE* provided at inputs 20 and 24 respectively, is used to retime the output of multiplexer 46. This flip-flop is not enabled during the two previously-mentioned overhead bytes. Output 8 provides the one bit relating to the tributary mode. Inputs 26 and 28 are connected respectively to 8 and 16 MHz clocks.

Figure 8B:
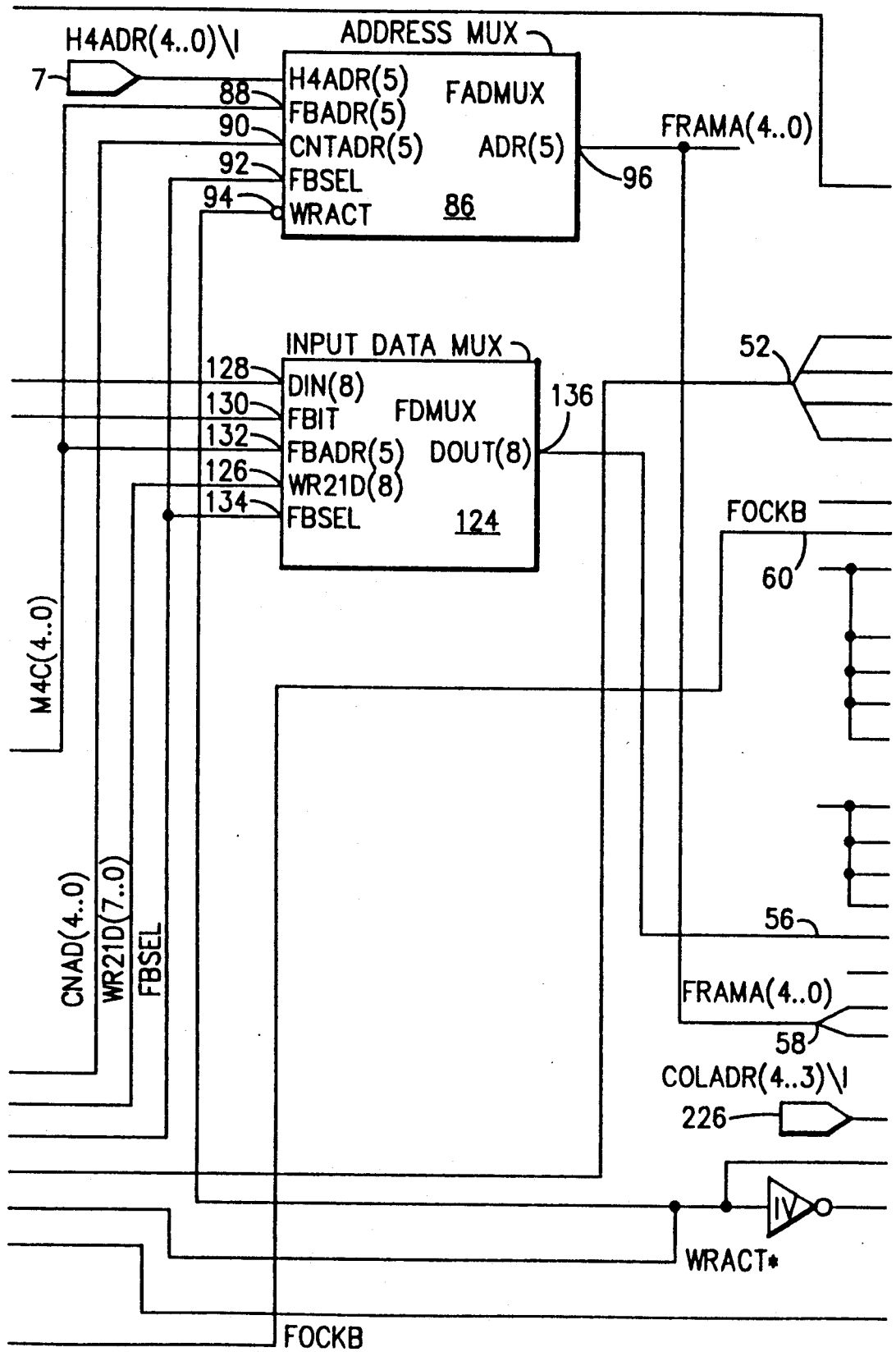
Figure 8C:
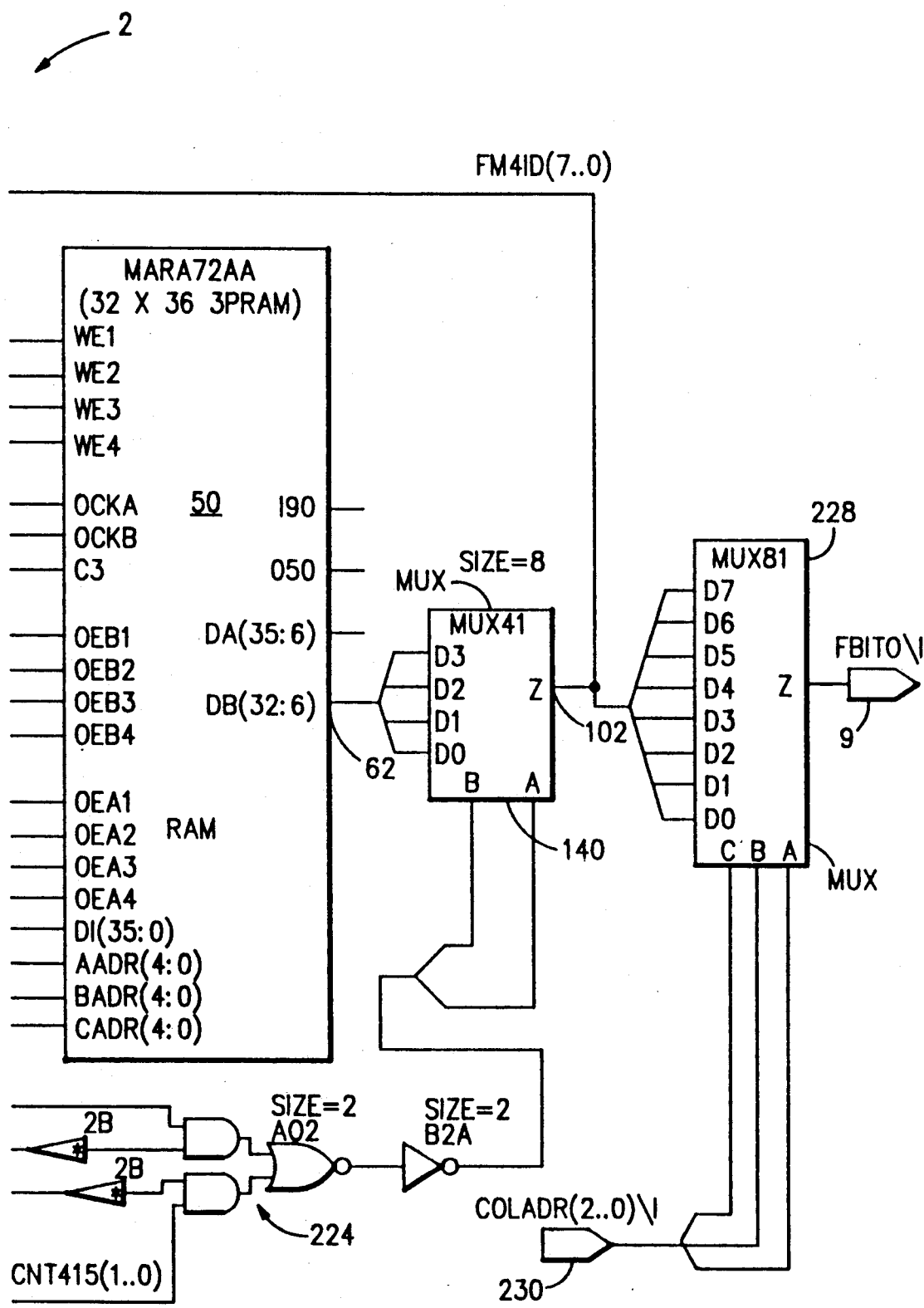

FIG. 8 shows the alignment circuit 2 of FIG. 4. A 32-bits by 36 bits RAM 50 is used to store the F-bits and the counters, which will indicate the addresses of the F-bits. RAM 50 can be updated 8 bits at a time, using four write enable strobes received at inputs 52. Only eight of these nine bits are used in this design, as illustrated in Tables 3 and 4. F-bits are provided to the RAM at an input 56.

As shown in Table 4, 24 RAM address rows store the F-bits for 24 SONET frames for 28 tributaries. The remaining 8 RAM address rows have 28 counters, four counters in some rows and three in others. Since every counter counts only up to 24, only five bits out of the eight available are needed for the counters. The F-bits are stored in rows 0-5, 8-13, 16-21, 24-29. In each row, bits 0-27 are used for F-bits, and the remaining four bits are not utilized. The RAM addresses are provided to an input 58. FOCKB is another control signal of the RAM which is provided to input 60. The RAM output 62 provides 32 bits of parallel data, the unused four bits are not shown in FIG. 8.

A shift register circuit 64 comprises three 28-bit shift registers, a shown in Greater detail in FIG. 9, to store 28 F-bits and 56 MFS bits. The F-bits are received at input 5, and the MFS bits are received at input 6. The F-bits received at input 5 originate from byte 3, as shown in FIG. 2. The F-bits which are read from any tributary are shifted into a shift register during the transmission of the new F-bits, and are loaded into the RAM later. A row 26 signal at input 66 indicates the occurrence of the SONET signaling row, the first row shown in FIG. 3, where F-bits are located. A CLR signal at input 68 is a reset signal. The 8 MHz clock is received at an input 70 and a Shift Register Enable, SREN, signal is received at input 72. Shift register circuit 64 provides F-bits at an output 74 and an MFS transition signal at an output 76.

MFS is the master frame synchronization signal which is read from the internal 16-bit byte and indicates the frame alignment of each virtual tributary. The MFS bits are used to determine the offset required to align the tributary F-bits found in row three of the SONET frame shown in FIG. 3. Two 28-bit registers are used to store 28 current MFS bits and 28 previous MFS bits. The transition from zero to one of these bits as shown in Table 1 must be detected to clear the count values for the tributary to which the MFS bits are associated.

FIG. 9 shows the details of shift register circuit 64 having three 28-bit shift registers 78-82. The reset input 68 is connected to the clear inputs of the shift registers through inverters. The MFS bits are received at input 6 while the F-bits are received from input 5. Inputs 66 and 72 are used to generate the shift register enable signal. The ROW26 signal at input 66 is used to enable the shift registers during the signaling row and SREN* at input 72 is used to read them out for writing to the RAM. Register 78 is loaded with the output of register 80 while register 80 is being loaded with the current MFS bits. After 28 clock cycles of the signaling row the old and new MFS bits are loaded. At times, other than ROW26 the output of shift register 80 is fed back to its input. A NAND gate 84 connected to the outputs of shift registers 78 and 80 is used to detect a one-to-zero transition of this signal to provide output 76. Shifted F-bits are available at the output 74.

Address multiplexer 86 is used to generate read and write addresses for the RAM. F-bits shown in FIG. 2, byte 3 are read out during the signaling row transmission. Twenty-eight tributary F-bits are ready at the RAM output when addressed by the SONET H4 multiframe indicator byte. Multiframe indicator byte H4 has a sequence as shown in Table 1 for bits 0, 4, 5, 6 and 7. Input 7 receives the five bits of the H4 byte and multiplexer 86 uses these for read sequences of the RAM. Input 88 receives F-bit addresses while input 90 receives counter addresses for writing to the RAM. The inputs 92 and 94 receive control signals for the multiplexer. A five-bit output 96 is connected to the RAM address inputs 58.

Figure 10:
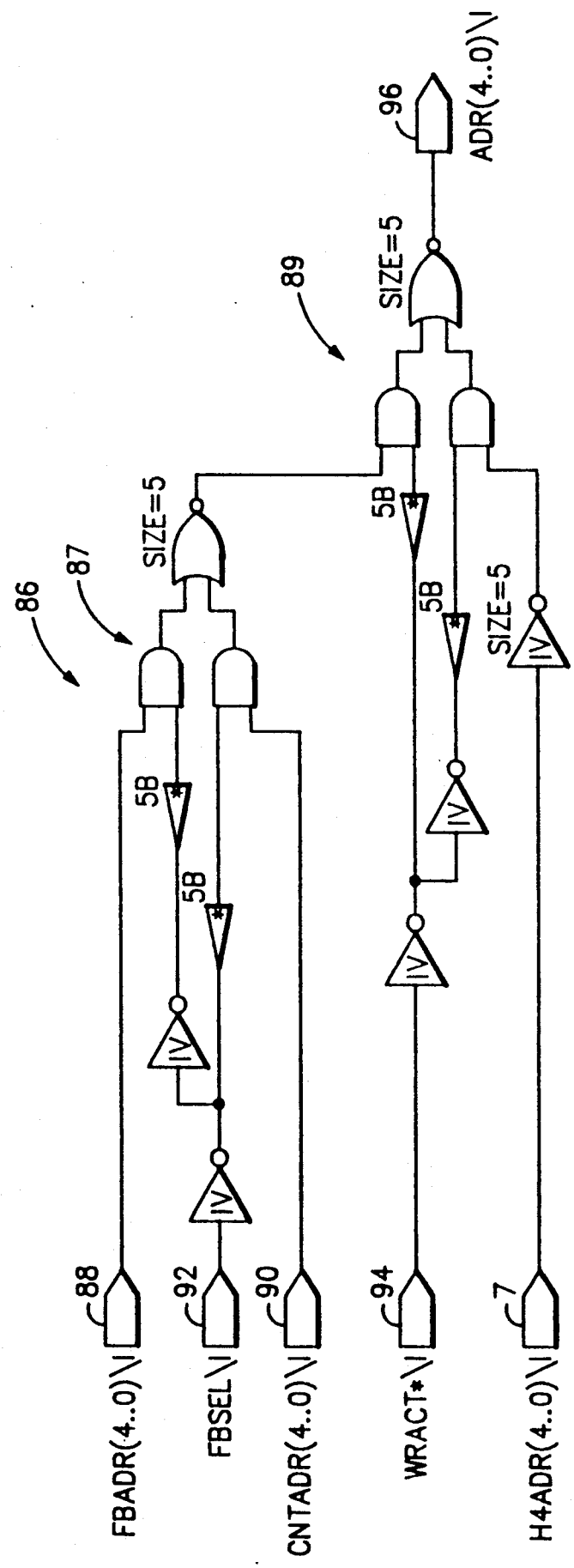
FIG. 10 is a schematic diagram of block 86 of FIG. 8B.

FIG. 10 shows an implementation of address multiplexer 86 which has gates forming multiplexers 87 and 89. When the signal on input 94 is active low, one of the write addresses, which can be F-bit addresses at input 88 or counter addresses at input 90, are provided to the output 96. The input 92 selects F-bit addresses as write addresses when it is active high. When input 94 is high, the H4 byte bits 0, 4, 5, 6 and 7 on input 7 are provided as read addresses to the output 96.

A modulo-6 ADDER 98 receives the counter values, which are stored in the RAM. The counter values are used as F-bit memory write addresses. The ADDER receives at an input 100 the five-bit counter values from multiplexed RAM outputs 102. An inverted reset signal is connected to an input terminal 104. The 8 MHz clock from input 70 is also connected to the ADDER 98 at an input 106. Inputs 108 and 110 receive control signals for the ADDER, while a new address count is provided at output 112. Input 108 receives the MFS bit transition signal from output 76 of the shift register circuit 64. Input and output counts of the ADDER are shown in Table 5.

TABLE 5

| Modulo-6 ADDER Input and Output Relationship | |
|---|---|
| Input | Output |
| 00000 | 00001 |
| 00001 | 00010 |

TABLE 5-continued

Modulo-6 ADDER Input and Output Relationship

| Input | Output |
| --- | --- |
| 00010 | 00011 |
| 00011 | 00100 |
| 00100 | 00101 |
| 00101 | 01000 |
| 01000 | 01001 |
| 01001 | 01010 |
| 01010 | 01011 |
| 01011 | 01100 |
| 01100 | 01101 |
| 01101 | 10000 |
| 10000 | 10001 |
| 10001 | 10010 |
| 10010 | 10011 |
| 10011 | 10100 |
| 10100 | 10101 |
| 10101 | 11000 |
| 11000 | 11001 |
| 11001 | 11010 |
| 11010 | 11011 |
| 11011 | 11100 |
| 11100 | 11101 |
| 11101 | 00000 |

Figure 11A:
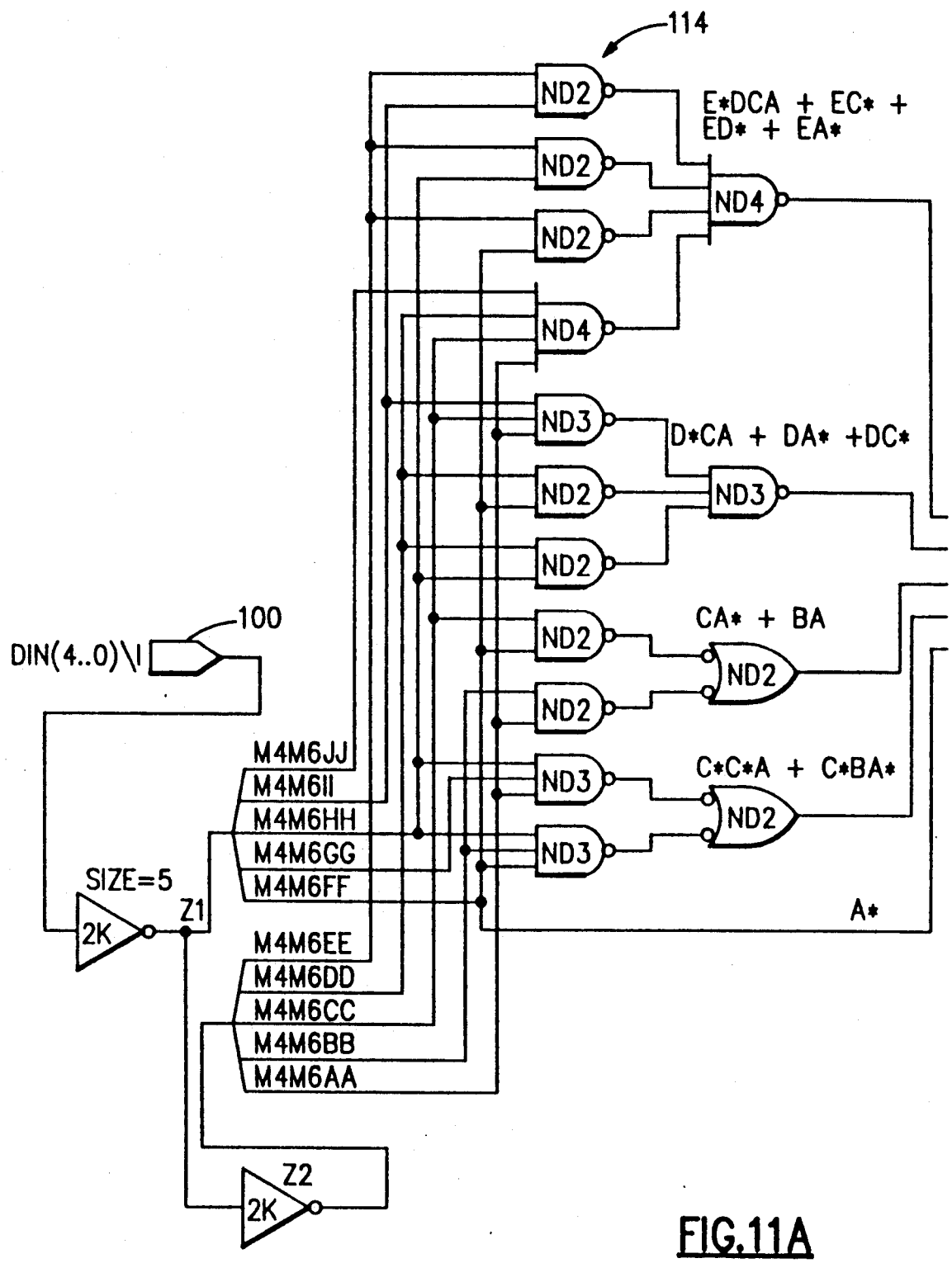
FIGS. 11, 11A and 11B are schematic diagram of block 98 of FIG. 8A.
Figure 11:
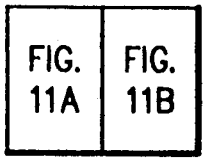
Figure 11B:
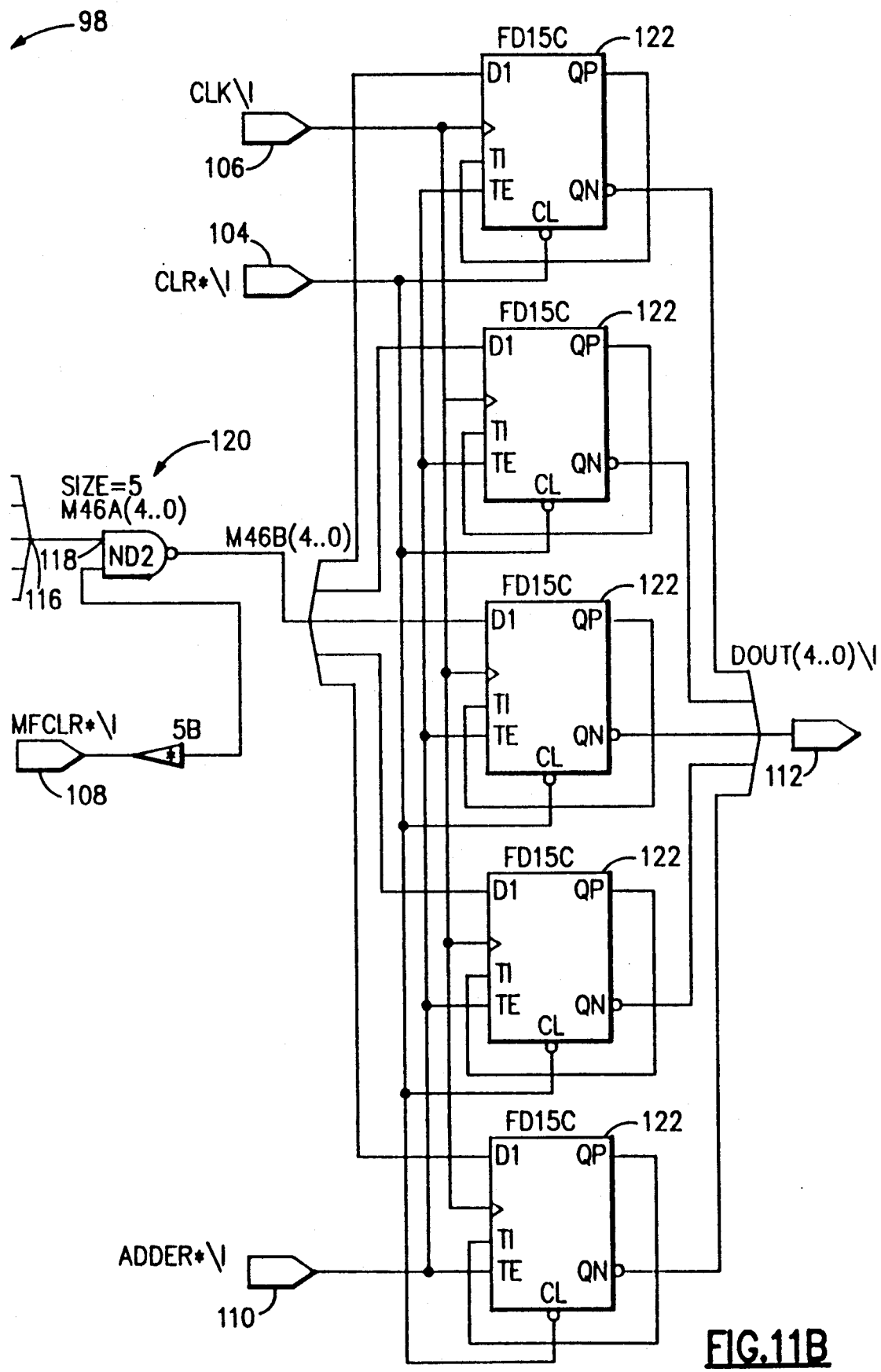

Details of the modulo-6 ADDER 98 are shown in FIG. 11. Gate arrangement 114 has five outputs 116 connected to five inputs 118 of an array of five NAND gates 120. The outputs of gate arrangement 114 are related to the input counts at the input 100, as shown in Table 5. The other inputs 108 of the NAND gates 120 are used to output a zero pattern and reset the counter values when the MFS bit transitions as detected in shift register circuit 64 are provided at output 76. The five bits at output 112 are used as a F-bit address and as data information to the RAM 50; therefore, they should be stored for more than one clock period so the output of the NAND gates 120 are loaded to the flip-flops 122 during the activation of input 110.

The F-bits can be updated one bit at a time, while the others remain the same. The RAM 50 is written to in 8-bit groups because of the four write strobes. Multiplexer 124 functions as a data multiplexer for RAM 50. Input 126 receives a signal that indicates which one of the four 8-bit F-bit groups read from RAM output 62 will be changed while input 128 receives the RAM outputs. Input 130 receives the F-bit which will be updated from the shift register 64 output 74. The ADDER 98 outputs must also be loaded to the RAM when the counter locations are addressed. Input 132 receives the ADDER outputs while a select signal is received at input 134. An output 136 has the 8-bit data for RAM input 56.

Figure 12:
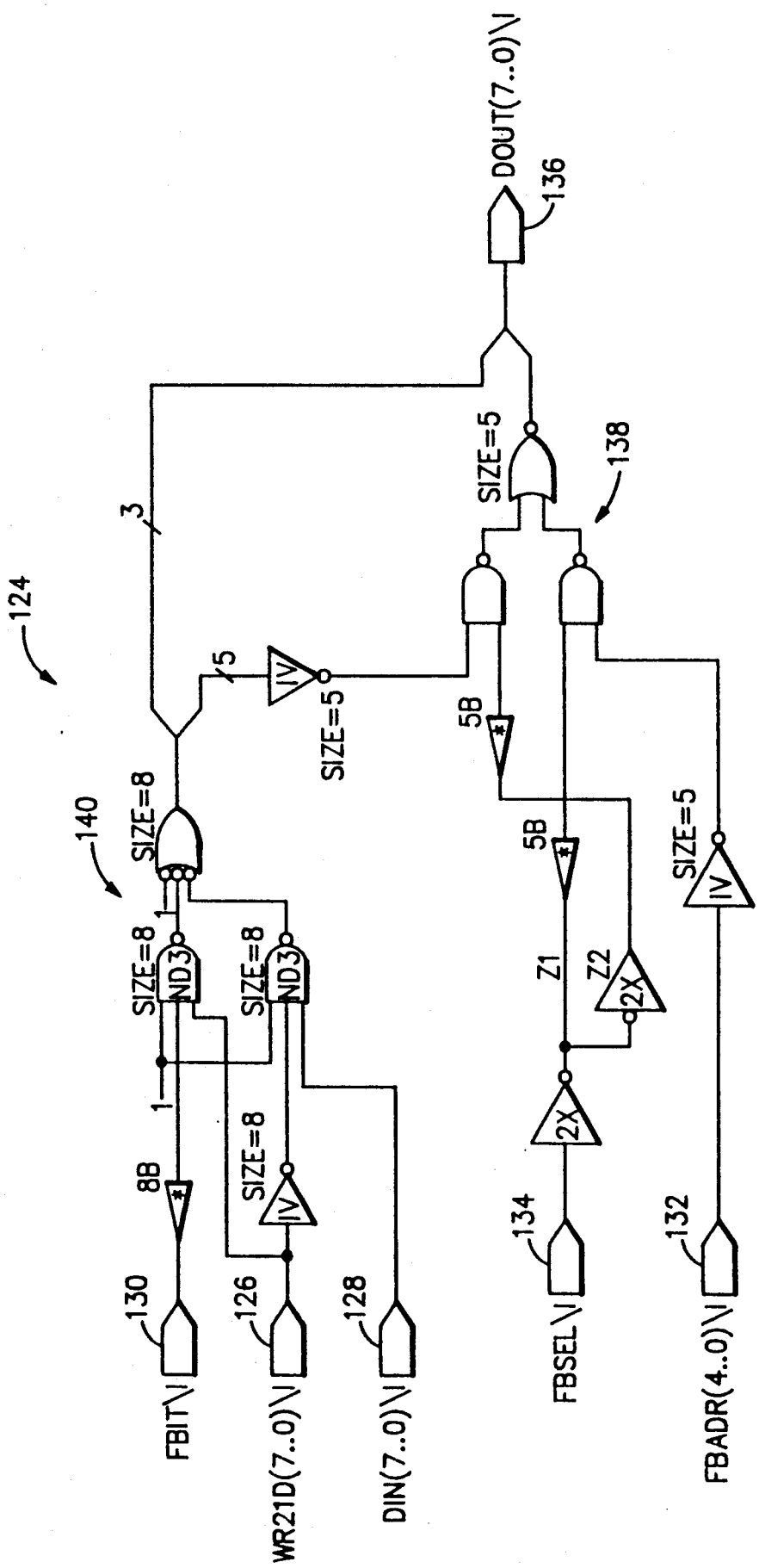
FIG. 12 is a schematic diagram of block 124 of FIG. 8B.

FIG. 12 shows the data multiplexer 124 of FIG. 8. Multiplexer 124 has a gate arrangement 138 which functions as a multiplexer. Gate arrangement 138 comprises five sets of gates, as shown. This multiplexer outputs to terminal 136 either F-bits to be loaded into RAM 50 or F-bit addresses to be loaded into counter locations, depending upon the FBSEL signal on the input 134. The output 74 of shift register 64 is connected to input 130, while the RAM outputs from multiplexer 140 are connected to the input 128 Input 126 receives a signal that indicates the F-bit which will be changed in the 8-bit group at the input 128. Only one of the eight bits at input 126 can be a logic one at a time. Gate arrangement 140 comprises eight sets of gates as shown. Gate arrangement 140 passes one of the F-bits at input 128 in accordance with the signal at input 126. When the input 134 is not active, the input 132 is provided to the output 136.

Figure 3B:
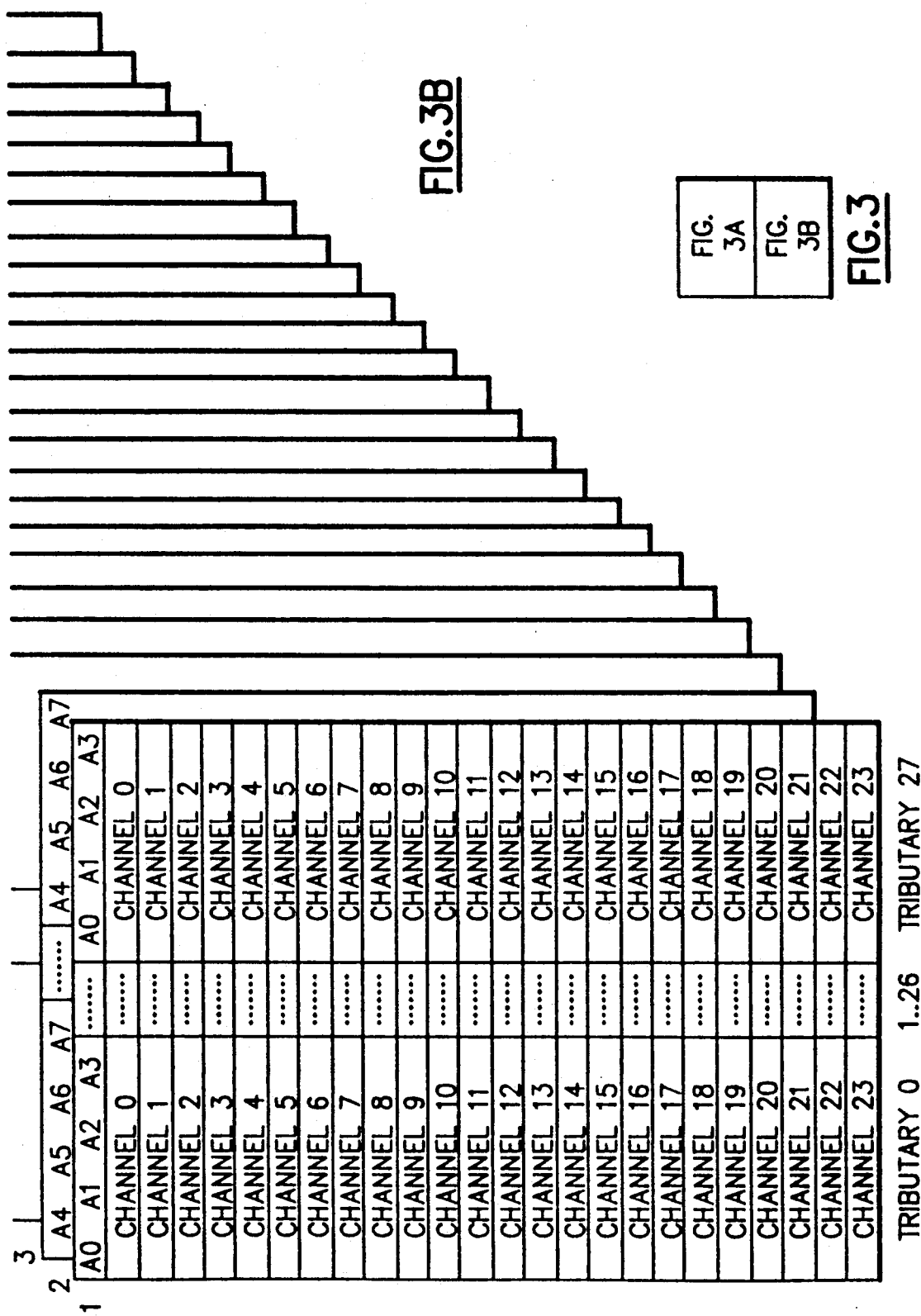
Figure 3A:
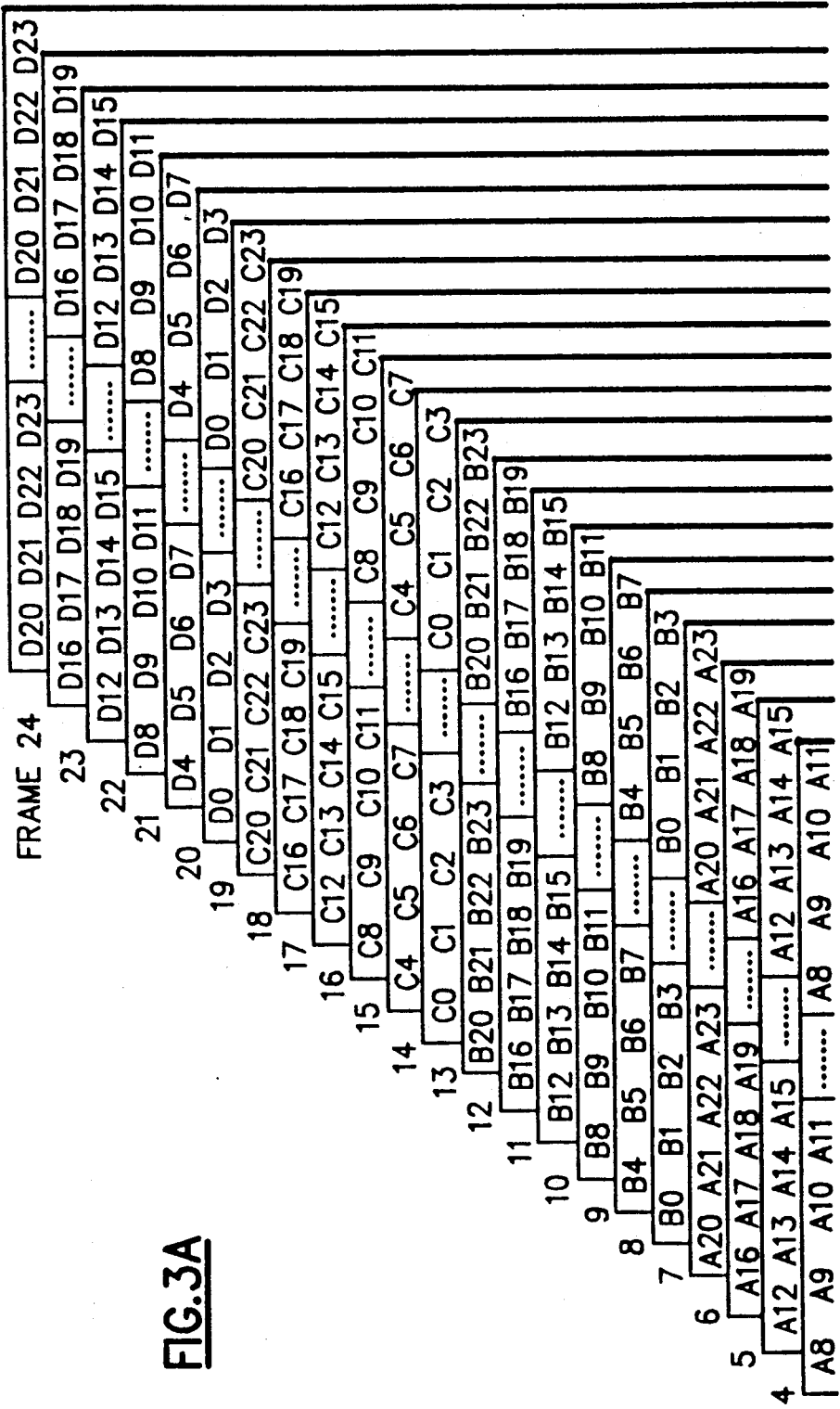

The control signals and RAM counter write addresses are generated in an F-bit strobe generator 142. The RAM is read during the signaling row, the first row shown in FIG. 3, and the write operation is performed during the rest of the SONET frame. A signal at input 144 starts the write sequence and is decoded from the address of channel 0 of tributary 0, as shown in FIG. 3. The 8-MHz clock is received from input 70, while an inverted reset signal is received on input 146. Output 148 is connected to input 60 of the RAM, while an output 150 is a test output and not used in this invention.

Figures 13, 13A:
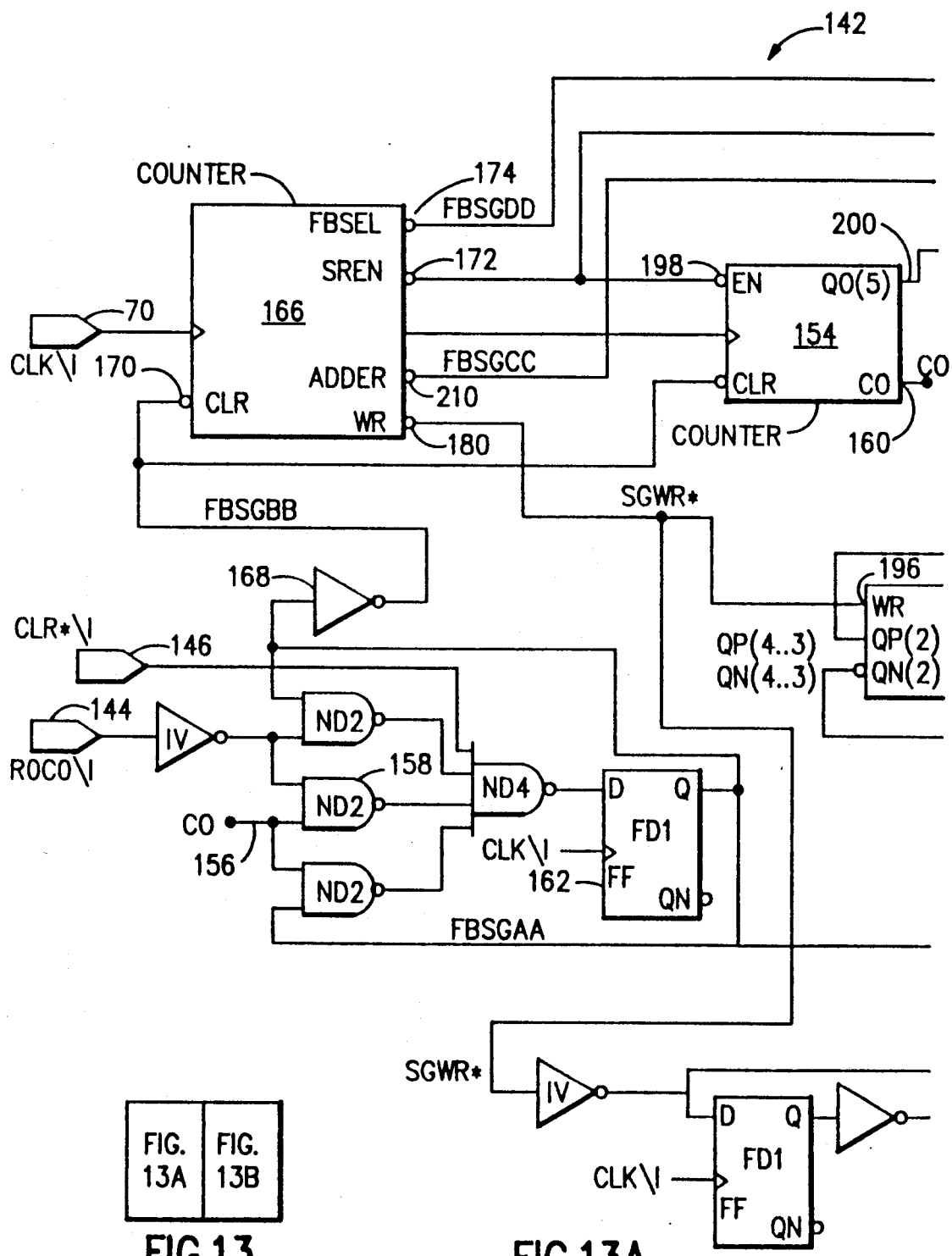
FIGS. 13, 13A and 13B are a schematic diagram of block 142 of FIG. 8A.
Figure 13B:
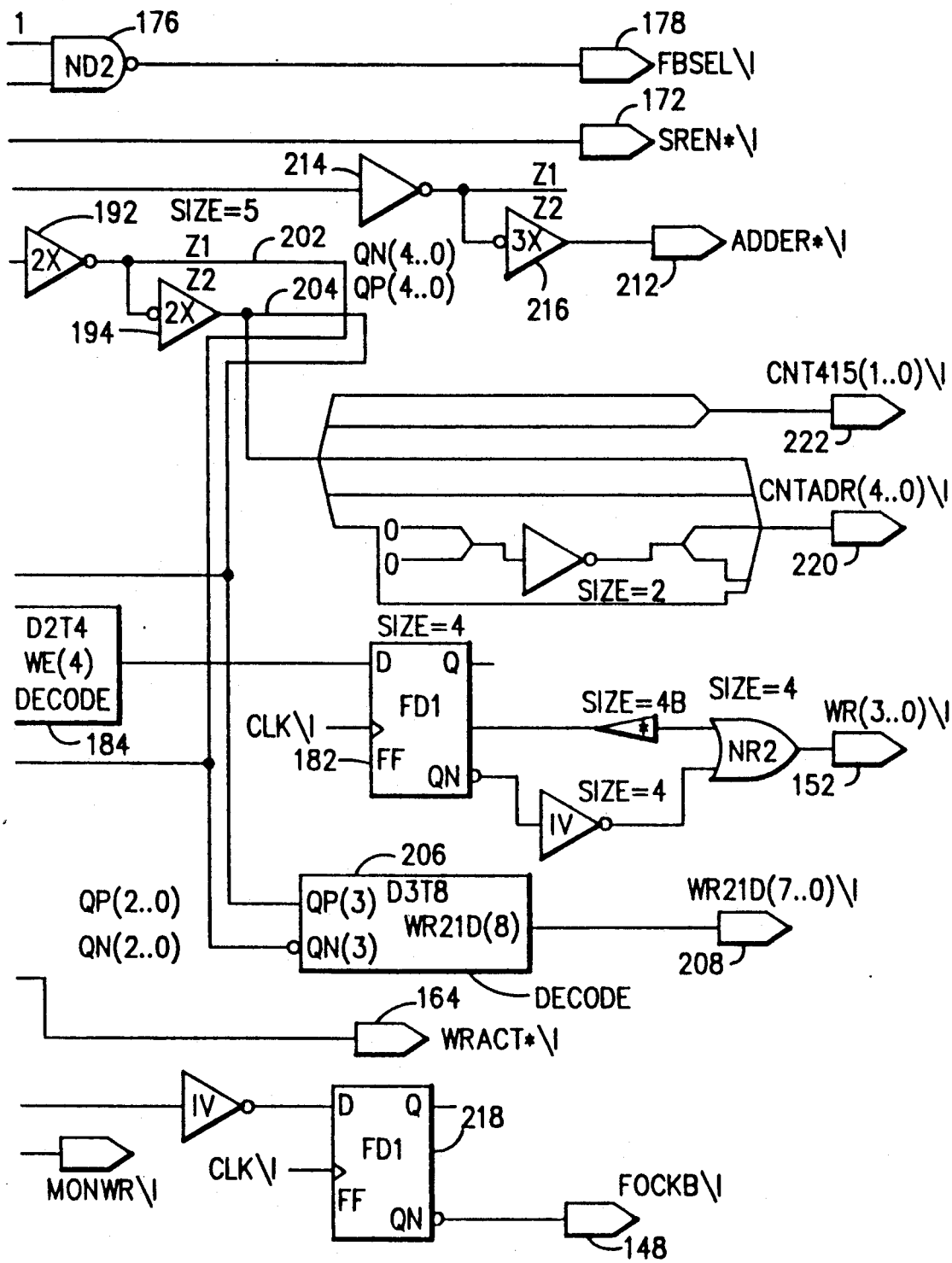

The F-bit strobe generator 142 is shown in greater detail in FIG. 13. The generator provides at output 152 four write strotes for RAM 50. Eight clock cycles are required to update each RAM locations. A tributary counter 154 is incremented once every eight clock cycles, and the write sequence for the entire RAM is completed in 224 clock cycles. The input 156 of NAND gate 158 is internally connected to the tributary counter output 160, which indicates the completion of a write sequence. The output flip-flop 162 is connected to output 164, which is an active low signal during a write time.

Figure 14:
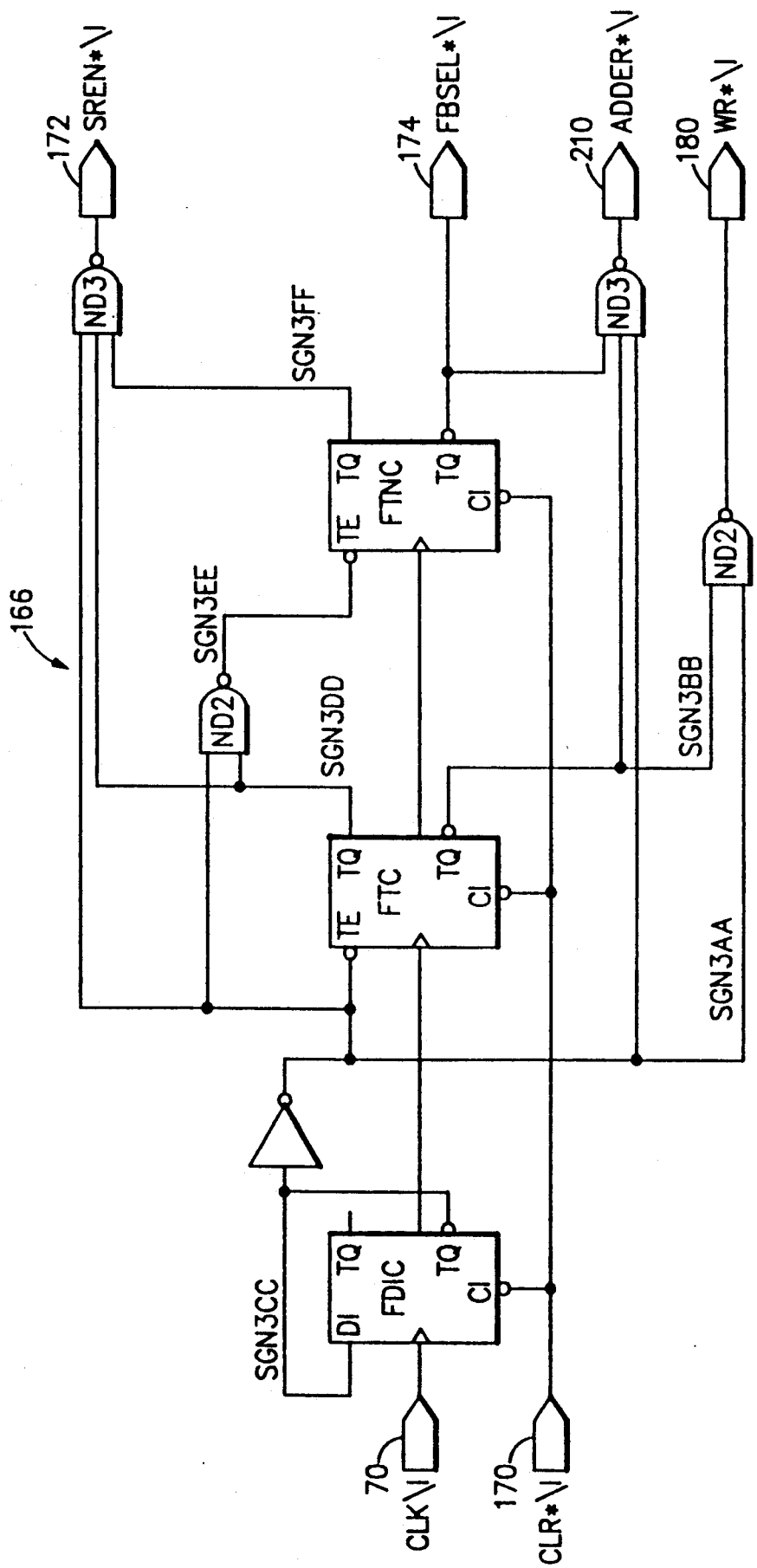
FIG. 14 is a schematic diagram of block 166 of FIG. 13A.

The output 164 is also connected to a three-bit counter 166 through an inverter 168. Counter 166 generates control signals. Details of counter 166 are shown in FIG. 14. Counter 166 has an input 170 connected to the inverted write activation signal on output 164. The counter is incremented with every clock cycle during the RAM write sequence and whenever its output reaches the 111 state. An output 172 is activated to increment tributary counter 154. The control input 92 of address multiplexer 86 in FIG. 10 is generated in this 3-bit counter and is provided at the output 174 and is provided to the multiplexer 86 through an inverter 176 and output 178. During the first four of eight clock cycles, output 178 is not active, so that the counter addresses are provided to the RAM address inputs 58, and during the next four clock cycles the F-bit addresses are given to the RAM address inputs 58.

Figure 16:
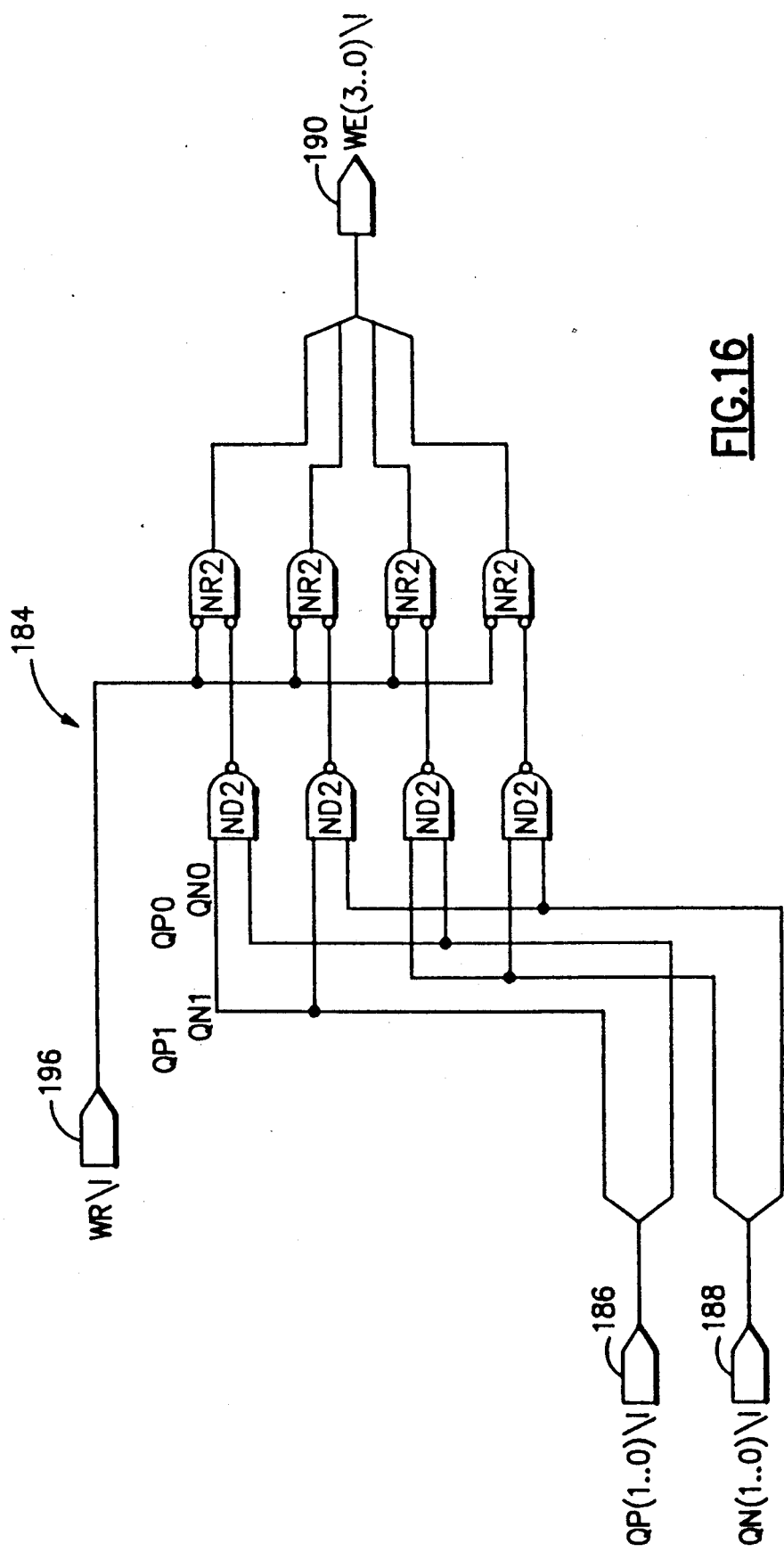
FIG. 16 is a schematic diagram of block 184 of FIG. 13B.

The write strobe is generated two times. The counter output 180 is active when the counter outputs values of 2 and 6. But the actual write strobes are available at the third and seventh clock cycles at the output 152 because of the one clock delay of the flip-flop 182 shown in FIG. 13. A 2 to 4 decoder 184 which in FIG. 16 provides outputs at 190 indicating which one of the four write strobes will be activated. The inputs 186 and 188 are each internally connected to the two most significant bits of tributary counter 154, which are provided through inverters 192 and 194 and outputs 202 and 204. Input 196 of decoder 184 is connected to output 180 of three-bit counter 166.

Figure 15:
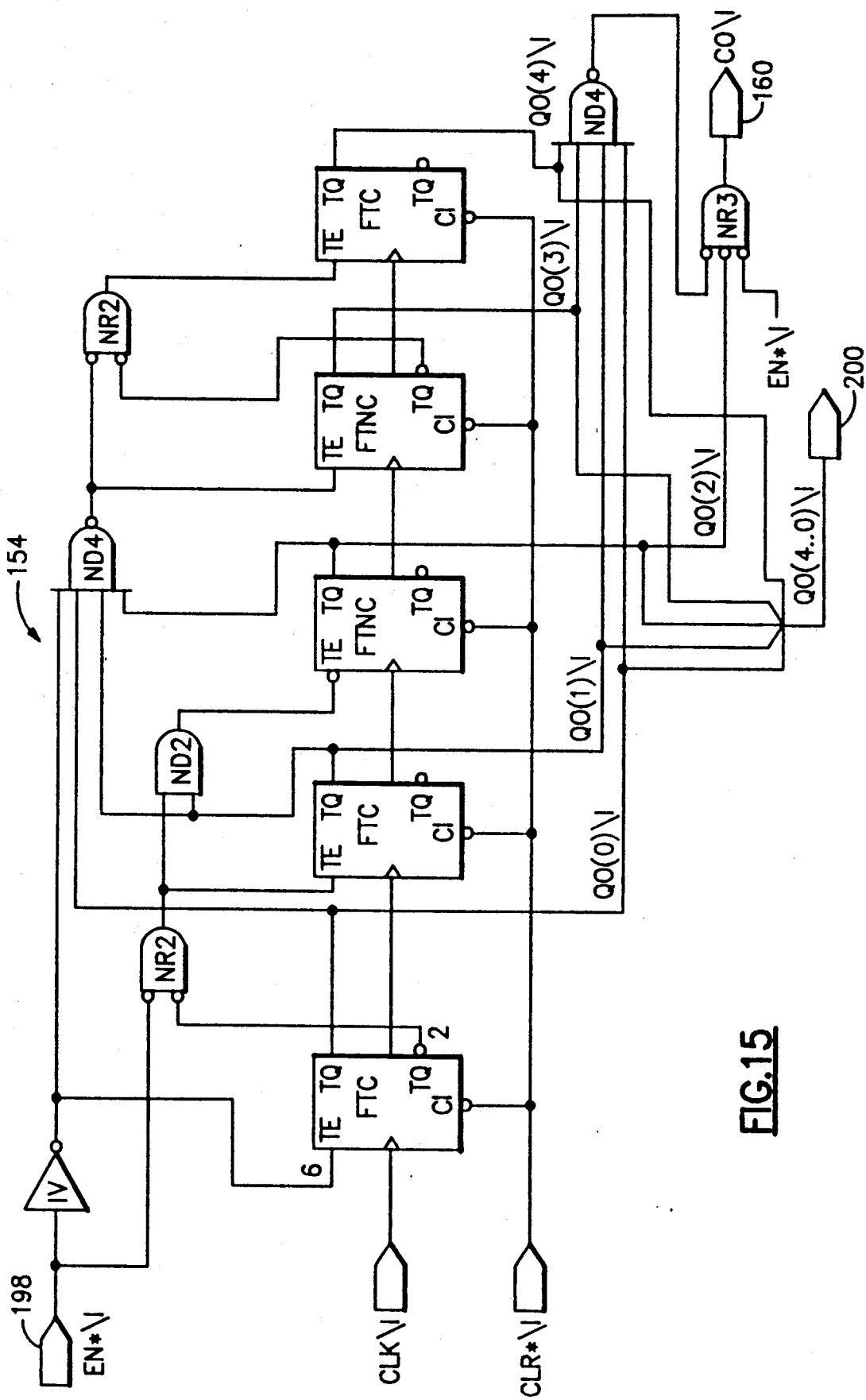
FIG. 15 a schematic diagram of block 154 of FIG. 13A.

Counter 154 is shown in detail in FIG. 15. The tributary counter is enabled until the write sequence is completed, as indicated by the input at 198. Five-bit outputs 202 and 204 of five-bit gates 192 and 194 are tributary addresses. The least significant three bits of tributary counter 154 are connected to a two to eight decoder 206 to select the F-bit position which will be updated and overwritten. Decoder 206 has an output 208 which is connected to the data multiplexer input 126 in FIGS. 8 and 12.

An ADDER control signal is at the output 210 of counter 166 and is activated in the second clock cycle of eight. The ADDER control signal is provided to output 212 through inverters 214 and 216. The output 148 is connected to the RAM 50 control input 60 and is generated from the output 180 of the counter 166 which is connected to the input of flip-flop 218 through two inverters.

The counter addresses at output 220 are also generated from the output of the tributary counter 154 as provided at outputs 204. The bits 1 and 2 of the output 220 are always logic 1 and are related to the address locations which are used to store the counters. Bits 1 and 2 are combined with the least significant three bits of counter 154. The most significant two bits of counter 154 are provided at output 222 and are connected to the input of multiplexer 224 shown in FIG. 8.

Referring again to FIG. 8, a gate arrangement forms a multiplexer 224 which develops the control signal for multiplexer 140. During a read sequence multiplexer 224 outputs the two most significant bits of tributary column addresses connected to its input 226. The tributary column addresses are provided by the system for which the invention was designed. The addresses are derived by counters synchronized by the payload pointer provided in SONET overhead bytes H1 and H2. This selects the tributary groups 0–7, 8–15, 16–23 or 24–27. The F-bits belonging to one of these groups is outputted at 102. A multiplexer 228, which is controlled by the least significant three bits of tributary column addresses at the input 230, gives one F-bit at a time to the output 9, said bit being related to the addressed tributary.

During the write sequence, multiplexer 224 outputs the two most significant bits of the addresses of the tributary whose F-bit and counter are being updated. These address bits are generated by strobe generator 142.

Thus, framing bits for added tributaries are aligned using a unique RAM usage configuration. Counter values are stored in RAM for each tributary and are continuously incremented using a read-modify-write procedure with a modulo-6-adder. These counter values are reset in accordance with the framing of the tributary. The counter values are used as addresses for storing F-bits received from the tributaries so that the F-bits are stored in accordance with their frame alignment in the tributary. The addresses where the F-bits are stored are devised to correspond with the SONET H4 multiframe indicator bytes so that the H4 byte can be used directly as a read address for the RAM so that a row of F-bits, one for each tributary, can be read out during the SONET signaling row. Through tributaries are passed without F-bit realignment.

What is claimed is:

1. A system for aligning framing bits from independent digital transmission facilities with framing of a higher transmission rate facility, comprising:
   means for receiving framing bits from said independent digital transmission facilities;
   memory means for storing said framing bits;
   means for storing said framing bits at locations in said memory means, said locations having a corresponding relation to a multiframe address of each framing bit to be stored, said multiframe address being indicative of the location of the framing bit in a multiframe format of the independent digital transmission facility with which the framing bit is associated; and
   means for reading said framing bits from locations in said memory means, said locations corresponding to a multiframe indicator signal corresponding to the framing of the higher transmission rate facility, whereby the framing bits as read retain the same relationship as existed in the multiframe format of the independent facility but are aligned with the multiframe format of the higher transmission rate facility.

2. A system as described in claim 1, additionally comprising means for passing selected framing bits without being aligned.

3. A system as described in claim 2, wherein the means for passing selected framing bits comprises a multiplexer means having a first input for receiving framing bits received at said means for receiving framing bits, a second input for receiving framing bits from said means for reading said framing bits from locations in said memory means and an output for selectively providing aligned or unaligned framing bits.

4. A system as described in claim 3, wherein the multiplexer additionally includes a control input connected to a means for identifying framing bits which are to pass through the system without alignment.

5. A system as described in claim 4, wherein the means for identifying framing bits which are to pass through comprises a plurality of memory means, one for each independent digital transmission facility handled by the higher transmission rate facility, said memory means for storing a signal indicative of whether the framing bits for the independent digital transmission facility are to pass through or be aligned, said signal being provided by a system controller.

6. A system as described in claim 1, wherein the multiframe indicator signal is a multiframe indicator byte having a plurality of bits, said bits defining an address of the location from which the framing bits are read from the memory means.

7. A system as described in claim 1, wherein the means for storing said framing bits comprises a means for generating multiframe addresses for the framing bits of each independent digital transmission facility.

8. A system as described in claim 7, wherein the means for generating multiframe addresses for the framing bits of each independent digital transmission facility comprises a frame counter means synchronized to the multiframe format of the independent digital transmission facility with which it is associated.

9. A system as described in claim 8, wherein each counter means comprises a location in said memory means for storing a count value corresponding to a multiframe address, said count value being incremented after each frame of the multiframe format of the independent facility is received.

10. A system as described in claim 9, wherein the multiframe indicator signal is one of a predetermined sequence of multiframe indicator bytes each having a plurality of bits, said bits defining an address of the location from which the framing bits are read from the memory means and the amount by which the stored count value is incremented is set to correspond to a predetermined incrementing of the sequence of multiframe indicator bytes, whereby the sequential addresses provided by the count values coincide with the sequential addresses of the multiframe indicator bytes.

11. A system as described in claim 10, additionally comprising means for performing a read-modify-write procedure on framing bits tore din a location of said memory means, whereby the framing bits at a location specified by the address of a count value are read, a newly received framing bit is multiplexed into the stored framing bits to update the framing bits, and the framing bits as updated are written back to the location in the memory means.

12. A system as described in claim 10, additionally comprising means for performing a read-modify-write operation on the count values stored in said memory means, whereby the count value for a particular location is read from the memory means, incremented by an adding means and is written back into the memory means.

13. A system as described in claim 10, wherein the count values are stored in the memory means at memory addresses not found in the multiframe indicator byte.

* * * * *

UNITED STATES PATENT AND TRADEMARK OFFICE
CERTIFICATE OF CORRECTION

PATENT NO.  : 5,033,044
DATED       : July 16, 1991
INVENTOR(S) : Williams et al It is certified that error appears in the above-identified patent and that said Letters Patent is hereby corrected as shown below:

At column 14, line 66, please delete "tore din" and insert --stored in--.

Signed and Sealed this

Twenty-second Day of December, 1992

*Attest:*

DOUGLAS B. COMER

*Attesting Officer*      *Acting Commissioner of Patents and Trademarks*